(12) United States Patent
Fujishiro et al.

(10) Patent No.: US 12,219,375 B2
(45) Date of Patent: Feb. 4, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 306 days.

(21) Appl. No.: 17/666,068

(22) Filed: Feb. 7, 2022

(65) Prior Publication Data
US 2022/0159485 A1    May 19, 2022

Related U.S. Application Data

(63) Continuation of application No. PCT/JP2020/028571, filed on Jul. 22, 2020.

(60) Provisional application No. 62/884,268, filed on Aug. 8, 2019.

(51) Int. Cl.
*H04W 24/04*  (2009.01)
*H04W 84/04*  (2009.01)

(52) U.S. Cl.
CPC .......... *H04W 24/04* (2013.01); *H04W 84/047* (2013.01)

(58) Field of Classification Search
CPC ... H04W 24/04; H04W 84/047; H04W 16/26; H04W 76/15; H04W 76/19; H04W 44/00; H04W 44/34; H04L 45/00–02
See application file for complete search history.

(56) References Cited

U.S. PATENT DOCUMENTS

| | | | |
|---|---|---|---|
| 2020/0092784 A1* | 3/2020 | Hampel | H04B 7/15528 |
| 2022/0015011 A1* | 1/2022 | Liu | H04W 76/15 |
| 2022/0070959 A1* | 3/2022 | Jung | H04W 76/19 |
| 2022/0132337 A1* | 4/2022 | Muhammad | H04W 40/34 |
| 2022/0217598 A1* | 7/2022 | Ishii | H04W 36/0058 |
| 2023/0239954 A1 | 7/2023 | Liu et al. | |

FOREIGN PATENT DOCUMENTS

WO   2022/068164 A1   4/2022

OTHER PUBLICATIONS

3GPP TSG-RAN WG2#106, Huawei, HiSilicon (R2-1906070) (Year: 2019).*

(Continued)

*Primary Examiner* — Ricky Q Ngo
*Assistant Examiner* — David M Kayal
(74) *Attorney, Agent, or Firm* — Studebaker & Brackett PC

(57) ABSTRACT

A communication control method according to a first aspect is a method used in a mobile communication system configured to form at least one communication path with a plurality of relay apparatuses between a user equipment and a donor apparatus. The communication control method includes: detecting, by a relay apparatus included in the plurality of relay apparatuses, a failure of a backhaul link between an upper apparatus higher than the relay apparatus and the relay apparatus; in response to the detecting of the failure in the backhaul link, transmitting, by the relay apparatus, a failure notification related to the failure of the backhaul link to a lower apparatus lower than the relay apparatus; and by the lower apparatus, in response to receiving the failure notification from the relay apparatus, stopping uplink transmission to the relay apparatus.

7 Claims, 17 Drawing Sheets

(56) References Cited

OTHER PUBLICATIONS

CATT; "Route Adaptation upon Backhaul RLF"; 3GPP TSG RAN WG2 Meeting #106, R2-1905837; May 13-17, 2019, pp. 1-9, Reno, USA.
Samsung; "RLF handling in dual connection for intermediate IAB node"; 3GPP TSG-RAN WG2 Meeting #106, R2-1908025; May 13-17, 2019, pp. 1-3, Reno, USA.
Huawei, HiSilicon, "Backhaul RLF Recovery"; 3GPP TSG-RAW WG2 #106, R2-1906070, May 13-17, 2019, Reno, USA.
Qualcomm Incorporated, "BH RLF handling for IAB"; 3GPP TSG-RAN WG2 Meeting #105bis, R2-1903583, Apr. 8-12, 2019, pp. 1-3, Xi'an, China.
Huawei, HiSilicon, "On backhaul link radio link failure handling for IAB"; 3GPP TSG RAN WG1 Meeting #97, R1-1906004, May 13-17, 2019, pp. 1-2, Reno, USA.
Nokia, Nokia Shanghai Bell, "BH link RLF notifications", 3GPP TSG-RAN WG2 Meeting #106, R2-1907187, Reno, USA, May 13-17, 2019, total 4 pages.
LG Electronics, "BH RLF detection criteria for DC and non-DC", 3GPP TSG-RAN WG2 Meeting #106, R2-1908061, Reno, USA, May 13-17, 2019, total 5 pages.

* cited by examiner

COMMUNICATION CONTROL METHOD

RELATED APPLICATIONS

The present application is a continuation based on PCT Application No. PCT/JP2020/028571, filed on Jul. 22, 2020, which claims the benefit of US Provisional Patent Application No. 62/884268 filed on Aug. 8, 2019. The content of which is incorporated by reference herein in their entirety.

TECHNICAL FIELD

The present disclosure relates to a communication control method used in a mobile communication system.

BACKGROUND ART

In the 3rd Generation Partnership Project (3GPP), which is a standardization project of a mobile communication system, a new relay apparatus referred to as an Integrated Access and Backhaul (IAB) node has been under study. One or a plurality of relay apparatuses are involved in communication between a base station and a user equipment, and perform relay for the communication.

Such relay apparatus includes a user equipment function and a base station function, and performs wireless communication with an upper node (the base station or an upper relay apparatus) by using the user equipment function and performs wireless communication with a lower node (the user equipment or a lower relay apparatus) by using the base station function.

A wireless section between the user equipment and the relay apparatus or the base station may be referred to as an access link. A wireless section between the relay apparatus and the base station or another relay apparatus may be referred to as a backhaul link. The 3GPP Contribution "RP-170217" describes a method of dynamically switching communication paths by integrating and multiplexing data communication in the access link and data communication in the backhaul link in Layer 2 and dynamically allocating radio resources to the backhaul link.

SUMMARY

A communication control method according to a first aspect is a method used in a mobile communication system configured to form at least one communication path with a plurality of relay apparatuses between a user equipment and a donor apparatus. The communication control method includes: detecting, by a relay apparatus included in the plurality of relay apparatuses, a failure of a backhaul link between an upper apparatus higher than the relay apparatus and the relay apparatus; in response to the detecting of the failure of the backhaul link, transmitting, by a BAP layer of the relay apparatus, a failure notification related to the failure of the backhaul link to a lower apparatus lower than the relay apparatus; and in response to receiving the failure notification from the relay apparatus, notifying, by a BAP layer of the lower apparatus, an upper layer of the lower apparatus of reception of the failure notification.

DESCRIPTION OF EMBODIMENTS

A mobile communication system according to an embodiment will be described with reference to the drawings. In the description of the drawings, the same or similar parts are denoted by the same or similar reference signs.

First Embodiment

Configuration of Mobile Communication System

Figure 1:
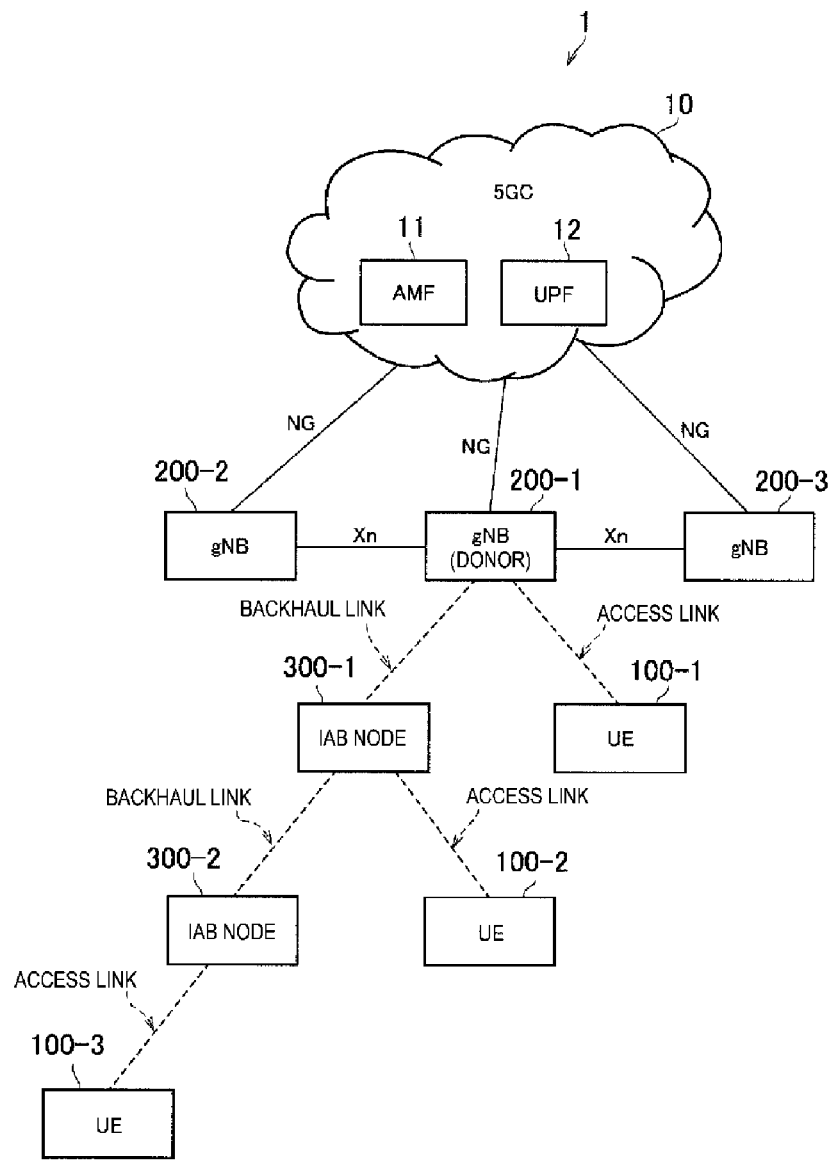
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system 1 according to an embodiment. The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, a user equipment (UE) 100, a base station (referred to as a gNB) 200, and an IAB node 300. The IAB node 300 is an example of a relay apparatus.

An embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

The gNB 200 is connected to the 5GC 10 via an interface referred to as an NG interface. FIG. 1 illustrates an example of three gNB 200-1 to gNB 200-3 that are connected to the 5GC 10. The gNB 200 is a fixed wireless communication apparatus that performs wireless communication with the UE 100. When the gNB 200 has a donor function, the gNB 200 may perform wireless communication with the IAB node that is connected to the gNB 200 wirelessly.

The gNB 200 is connected to another neighboring gNB 200 via an inter-base station interface referred to as an Xn interface. FIG. 1 illustrates an example in which the gNB 200-1 is connected to the gNB 200-2 and the gNB 200-3.

Each gNB 200 manages one or a plurality of cells. The cell is used as a term denoting a minimum unit of a wireless communication area. The cell may be used as a term denoting a function or a resource for performing wireless communication with the UE 100. One cell belongs to one carrier frequency.

The UE 100 is a mobile wireless communication apparatus that can perform wireless communication with the gNB 200. The UE 100 may perform wireless communication with the IAB node 300. The UE 100 may be any type of apparatus as long as the UE 100 performs wireless communication with the gNB 200 or the IAB node 300. For example, the UE 100 is a mobile phone terminal, a tablet terminal, a laptop PC, a sensor, an apparatus that is provided in a sensor, a vehicle, or an apparatus that is provided in a vehicle.

FIG. 1 illustrates an example in which UE 100-1 is connected to the gNB 200-1 wirelessly, UE 100-2 is connected to an IAB node 300-1 wirelessly, and UE 100-3 is connected to an IAB node 300-2 wirelessly. The UE 100-1 directly performs communication with the gNB 200-1. The UE 100-2 indirectly performs communication with the gNB 200-1 via the IAB node 300-1. The UE 100-3 indirectly performs communication with the gNB 200-1 via the IAB node 300-1 and the IAB node 300-2.

The IAB node 300 is an apparatus (relay apparatus) that is involved in communication between the eNB 200 and the UE 100, and performs relay for the communication. FIG. 1 illustrates an example in which the IAB node 300-1 is connected to the gNB 200-1 being a donor apparatus wirelessly, and the IAB node 300-2 is connected to the IAB node 300-1 wirelessly. Each IAB node 300 manages a cell. A cell ID of the cell managed by the IAB node 300 may be the same as or different from a cell ID of the cell of the donor gNB 200-1.

The IAB node 300 has a UE function (user equipment function) and a gNB function (base station function). Such UE functions may be referred to as MTs, and gNB functions may be referred to as DUs.

The IAB node 300 performs wireless communication with an upper apparatus (the gNB 200 or an upper IAB node 300) by using the UE function (MT) of the IAB node 300, and performs wireless communication with a lower apparatus (the UE 100 or a lower IAB node 300) by using the gNB function (DU) of the IAB node 300. "Upper" refers to a donor apparatus (gNB200) side with reference to the IAB node 300, and "lower" refers to the UE 100 side with reference to the IAB node 300.

The UE function (MT) refers to at least some of the functions of the UE 100, and the IAB node 300 need not necessarily have all of the functions of the UE 100. The gNB function (DU) refers to at least some of the functions of the gNB 200, and the IAB node 300 need not necessarily have all of the functions of the gNB 200. For example, the gNB function (DU) need not include an RRC layer, a PDCP layer, or the like.

A wireless section between the UE 100 and the IAB node 300 or the gNB 200 may be referred to as an access link (or, Uu). A wireless section between the IAB node 300 and the gNB 200 or another IAB node 300 may be referred to as a backhaul link (or, Un). The backhaul link may be referred to as a fronthaul link.

Data communication in the access link and data communication in the backhaul link can be integrated and multiplexed in Layer 2, radio resources can be dynamically allocated to the data communication in the backhaul link, and paths of relay can be dynamically switched. Note that, for the access link and the backhaul link, millimeter wave bands may be used. The access link and the backhaul link may be multiplexed by means of time division multiplexing and/or frequency division multiplexing.

Configuration of Base Station

Figure 2:
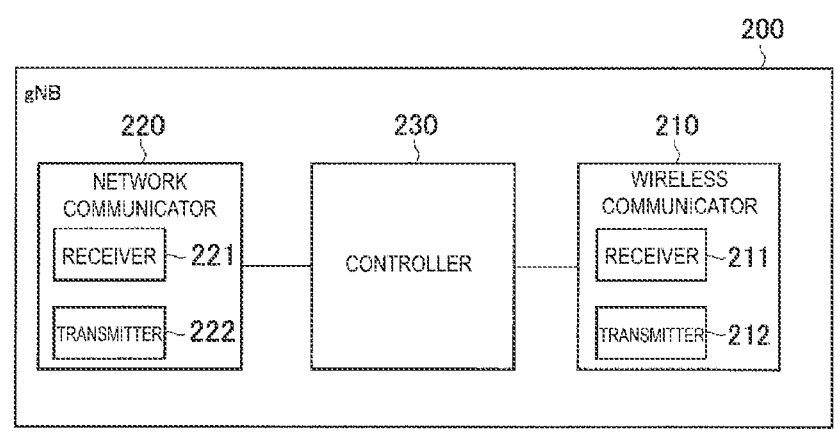
FIG. 2 is a diagram illustrating a configuration of a base station according to an embodiment.

Now, a configuration of the gNB 200, corresponding to a base station according to an embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 is used for wireless communication with the UE 100 and wireless communication with the IAB node 300. The wireless communicator 210 includes a receiver 211 and a transmitter 212. The receiver 211 performs various types of reception while being controlled by the controller 230. The receiver 211 includes an antenna, and converts a radio signal received by the antenna into a baseband signal (received signal) and outputs the baseband signal to the controller 230. The transmitter 212 performs various types of transmission while being controlled by the controller 230. The transmitter 212 includes an antenna, and converts a baseband signal (transmission signal) to be output by the controller 230 into a radio signal and transmits the radio signal from the antenna.

The network communicator 220 is used for wired communication (or wireless communication) with the 5GC 10 and wired communication (or wireless communication) with another neighboring gNB 200. The network communicator 220 includes a receiver 221 and a transmitter 222. The receiver 221 performs various types of reception while being controlled by the controller 230. The receiver 221 receives a signal from the outside and outputs the received signal to the controller 230. The transmitter 222 performs various types of transmission while being controlled by the controller 230. The transmitter 222 transmits a transmission signal output by the controller 230 to the outside.

The controller 230 performs various types of control for the gNB 200.

The controller 230 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing described below.

Configuration of Relay Apparatus

Figure 3:
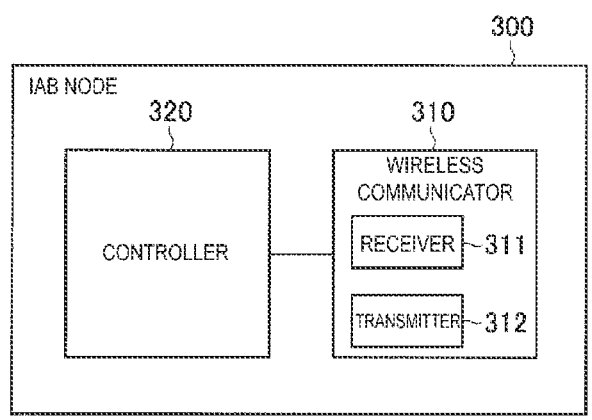
FIG. 3 is a diagram illustrating a configuration of a relay apparatus according to an embodiment.

Now, a configuration of the IAB node 300, corresponding to a relay apparatus according to an embodiment, will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 is used for wireless communication (backhaul link) with the gNB 200 and wireless communication (access link) with the UE 100. The wireless communicator 310 for the backhaul link communication and the wireless communicator 310 for the access link communication may be provided separately.

The wireless communicator 310 includes a receiver 311 and a transmitter 312. The receiver 311 performs various types of reception while being controlled by the controller 320. The receiver 311 includes an antenna, and converts a radio signal received by the antenna into a baseband signal (received signal) and outputs the baseband signal to the controller 320. The transmitter 312 performs various types of transmission while being controlled by the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing described below.

Configuration of User Equipment

Figure 4:
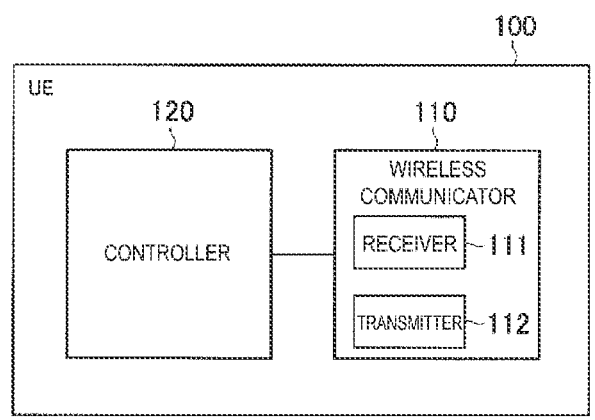
FIG. 4 is a diagram illustrating a configuration of a user equipment according to an embodiment.

Now, a configuration of the UE 100, corresponding to a user equipment according to an embodiment, will be described. FIG. 4 is a diagram illustrating a configuration of the UE 100. As illustrated in FIG. 4, the UE 100 includes a wireless communicator 110 and a controller 120.

The wireless communicator 110 is used for wireless communication in the access link, specifically, wireless communication with the gNB 200 and wireless communication with the IAB node 300. The wireless communicator 110 includes a receiver 111 and a transmitter 112. The receiver 111 performs various types of reception while being controlled by the controller 120. The receiver 111 includes an antenna, and converts a radio signal received by the antenna into a baseband signal (received signal) and outputs the baseband signal to the controller 120. The transmitter 112 performs various types of transmission while being controlled by the controller 120. The transmitter 112 includes an antenna, and converts a baseband signal (transmission signal) to be output by the controller 120 into a radio signal and transmits the radio signal from the antenna.

The controller 120 performs various types of control in the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing described below.

Example of Protocol Stack Configuration

Figure 5:
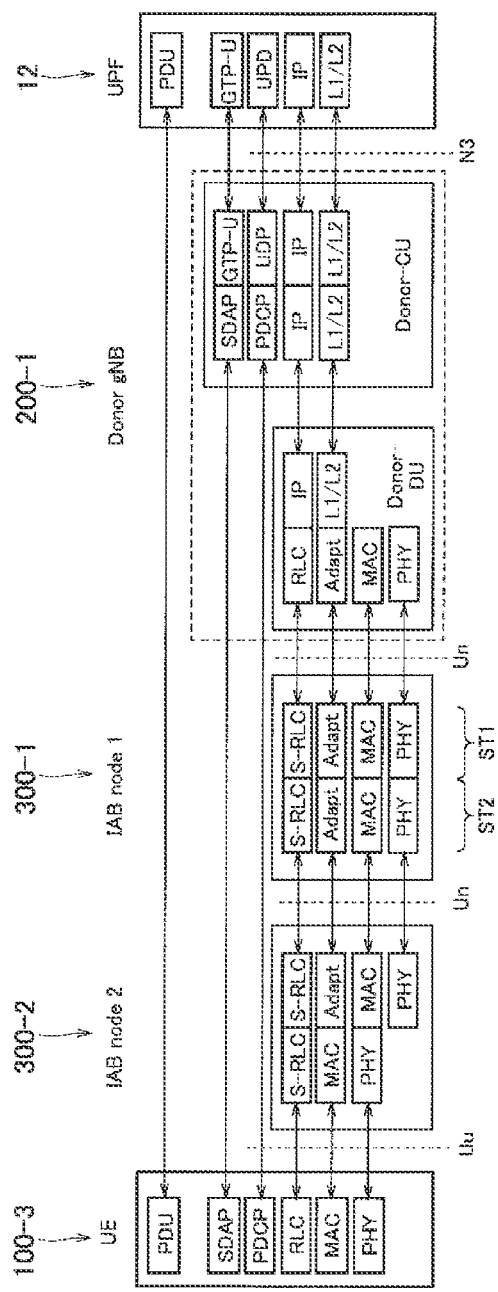
FIG. 5 is a diagram illustrating an example of a protocol stack configuration of a user plane according to an embodiment.

Now, an example of a protocol stack configuration in the mobile communication system 1 according to an embodiment will be described. FIG. 5 is a diagram illustrating an example of a protocol stack configuration of a user plane. FIG. 5 illustrates an example of a protocol stack configuration related to user data transmission between the UE 100-3 and the UPF 12 of the 5GC 10 illustrated in FIG. 1.

As illustrated in FIG. 5, the UPF 12 includes a GPRS Tunneling

Protocol for User Plane (GTP-U), a User Datagram Protocol (UDP), an Internet Protocol (IP), and a Layer 1/Layer 2 (L1/L2). The gNB 200-1 (donor gNB) is provided with a protocol stack corresponding to these.

The gNB 200-1 includes a central unit (CU) and a distributed unit (DU). Of the protocol stack of the radio interface, the CU includes layers at and higher than a Packet Data Convergence Protocol (PDCP), the DU includes layers at and lower than a Radio Link Control (RLC), and the CU and the DU are connected via an interface referred to as an F1 interface.

Specifically, the CU includes a Service Data Adaptation Protocol (SDAP), a PDCP, an IP, and an L1/L2. The SDAP and the PDCP of the CU perform communication with the SDAP and the PDCP of the UE 100 via the DU, the IAB node 300-1, and the IAB node 300-2.

Of the protocol stack of the radio interface, the DU includes an RLC, an adaptation layer (Adapt), a Medium Access Control (MAC), and a Physical layer (PHY). These protocol stacks are protocol stacks for the gNB. Note that the upper/lower relationship between the adaptation layer and the RLC (S-RLC) may be inverted. The adaptation layer may be referred to as a backhaul adaptation protocol (BAP) layer.

In the IAB node 300-1, a protocol stack ST1 for the UE corresponding to these is provided. In addition, in the IAB node 300-1, a protocol stack ST2 for the gNB is provided. Each of the protocol stack ST1 and the protocol stack ST2 includes layers (sub-layers) at or lower than Layer 2. Specifically, the IAB node 300-1 is a Layer 2 relay apparatus that performs relay of user data by using the layers at or lower than Layer 2. The IAB node 300-1 performs relay of data without using layers at or higher than Layer 3 (specifically, layers at or higher than the PDCP). Note that the IAB node 300-2 includes a protocol stack configuration similar to that of the IAB node 300-1.

The protocol stack configuration in the user plane has been described above. However, in the control plane, each of the gNB 200-1, the IAB node 300-1, the IAB node 300-2, and the UE 100-3 includes a Radio Resource Control (RRC) corresponding to Layer 3.

RRC connection is established between the RRC of the gNB 200-1 (donor gNB) and the RRC of the IAB node 300-1, and an RRC message is transmitted and received using the RRC connection. RRC connection is established between the RRC of the gNB 200-1 and the RRC of the IAB node 300-2, and an RRC message is transmitted and received using the RRC connection. In addition, RRC connection is established between the RRC of the gNB 200-1 and the RRC of the UE 100-3, and an RRC message is transmitted and received using the RRC connection.

Operations According to First Embodiment

Figure 6:
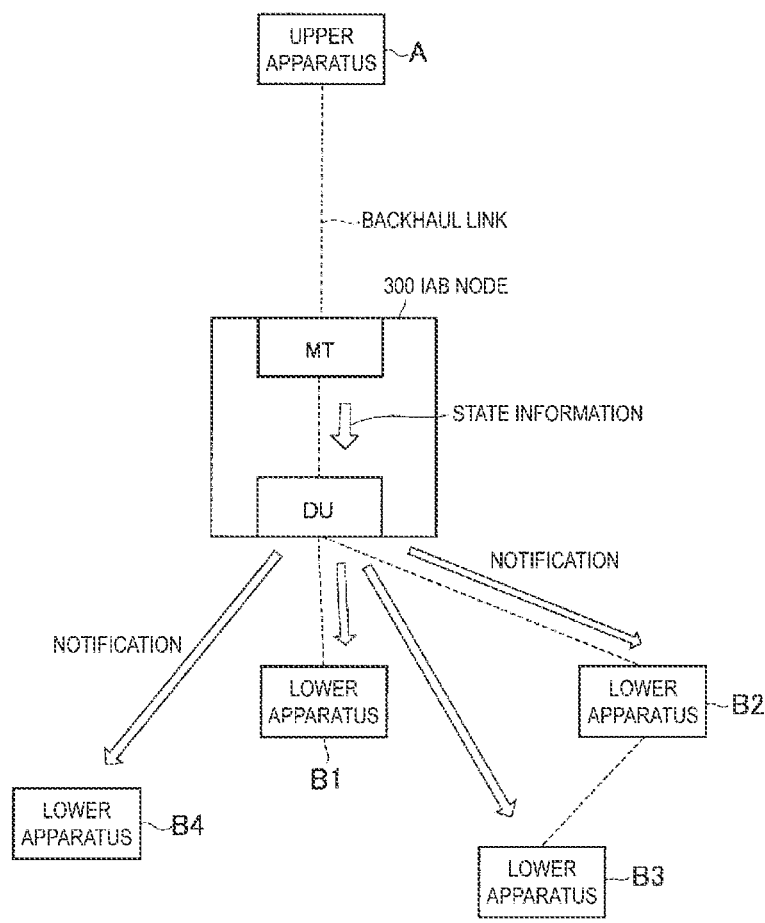
FIG. 6 is a diagram illustrating operations of the relay apparatus according to a first embodiment.

Now, operations according to the first embodiment will be described. FIG. 6 is a diagram illustrating operations of the IAB node 300 according to the first embodiment.

As illustrated in FIG. 6, the IAB node 300 is connected to an upper apparatus A via the backhaul link wirelessly. The upper apparatus A is an upper IAB node or a donor gNB (donor apparatus).

Lower apparatuses B1 and B2 are connected to the IAB node 300, and a lower apparatus B3 is connected to the lower apparatus B2. A lower apparatus B4 is an apparatus that is not under control of the IAB node 300. The lower apparatuses B1 to B4 are each a lower IAB node or UE. Unless the lower apparatuses B1 to B4 are particularly distinguished from each other, the lower apparatuses B1 to B4 are hereinafter simply referred to as "lower apparatus B".

In the first embodiment, in the IAB node 300 that relays communication between the upper apparatus A and the lower apparatus B wirelessly, the user equipment functional processor (MT) connected to the upper apparatus A wirelessly notifies state information to the base station functional processor (DU) connected to the lower apparatus B wirelessly.

The state information is information indicating at least one state of an RRC state of the user equipment functional processor (MT) and a radio link state (hereinafter referred to as a backhaul link state) between the upper apparatus A and the user equipment functional processor (MT). In this manner, the base station functional processor (DU) can control service provision for the lower apparatus B in consideration of the state on the backhaul link side.

Here, the RRC state of the user equipment functional processor (MT) is one of "connected", "inactive", and "idle".

The backhaul link state is a state that is based on at least one indicator out of the following 1) to 6), or a combination of these indicators.

1) An RLF state such as "backhaul RLF (hereinafter referred to as BH RLF) has been detected" and "recovered from the BH RLF"

2) Radio quality such as Reference Signal Received Power (RSRP)

3) A link state such as the number of times of Radio Link Control (RLC) retransmission and the number of times of Random Access Channel (RACH) retransmission 4) A degree of congestion such as a Received Signal Strength Indicator (RSSI), a Channel Busy Ratio (CBR), and a Listen Before Talk (LBT) state 5) The number of secondary cells being configured or activated, the number of Multiple Input Multiple Output (MIMO) layers, an allocation radio resource state (for example, increase and/or decrease of Configured grants in semi-static allocation, and increase and/or decrease of Dynamic grants in dynamic allocation), communication capacity such as a throughput measured value 6) A measured value of uplink scheduling delay time, and a delay state such as a data amount of an uplink buffer.

The backhaul link state may be how satisfactory the backhaul link state is on the basis of the indicators of 1) to 6) described above, and may be, for example, a state of being more satisfactory than a threshold or being poorer than the threshold.

The user equipment functional processor (MT) may report the state information to the base station functional processor (DU), with a trigger of a change of the RRC state or a change of the backhaul link state. For example, when an event in which the backhaul link state has satisfied a threshold condition has occurred, the user equipment functional processor (MT) reports the state information to the base station functional processor (DU).

Alternatively, the user equipment functional processor (MT) may periodically report the state information to the base station functional processor (DU).

The base station functional processor (DU) may stop service provision for the lower apparatus B, based on the state information from the user equipment functional processor (MT). To stop service provision for the lower apparatus B means to stop transmission of at least one downlink radio signal.

The base station functional processor (DU) may stop transmission of a Primary Synchronization Signal (PSS), a Secondary Synchronization Signal (SSS), or a Master Information Block (MIB).

For example, when the user equipment functional processor (MT) has transitioned to the RRC idle state or the RRC inactive state, the base station functional processor (DU) may stop service provision for the lower apparatus B. When the user equipment functional processor (MT) has transitioned to the RRC connected state, the base station functional processor (DU) may resume service provision for the lower apparatus B.

When the backhaul link is deteriorated, for example, when BH RLF is detected, the base station functional processor (DU) may stop service provision for the lower apparatus B. When the backhaul link improves, the base station functional processor (DU) may resume service provision for the lower apparatus B.

Alternatively, the base station functional processor (DU) may control radio resource allocation (scheduling) for the lower apparatus B, based on the state information from the user equipment functional processor (MT).

When the user equipment functional processor (MT) has transitioned to the RRC idle state or the RRC inactive state, the base station functional processor (DU) may stop resource allocation for the lower apparatus B. Note that, when the user equipment functional processor (MT) has transitioned to the RRC idle state or the RRC inactive state, the base station functional processor (DU) may request the user equipment functional processor (MT) to transition to the RRC connected state when uplink resources have been allocated to the lower apparatus B.

When the user equipment functional processor (MT) has transitioned to the RRC connected state, the base station functional processor (DU) may resume resource allocation for the lower apparatus B.

When the backhaul link is deteriorated, for example, when BH RLF is detected, the base station functional processor (DU) may stop resource allocation for the lower apparatus B. When the backhaul link is improved, for example, when recovery is made from the BH RLF, the base station functional processor (DU) may resume resource allocation for the lower apparatus B.

Alternatively, the base station functional processor (DU) may transmit, to the lower apparatus B, a notification indicating deterioration of the backhaul link, for example, a notification indicating occurrence of the BH RLF (hereinafter referred to as an RLF Notification or a BH RLF Notification), based on the state information from the user equipment functional processor (MT). The BH RLF Notification may include an identifier of the IAB node 300. The following will describe an example in which the notification indicating deterioration of the backhaul link is the BH RLF Notification.

The base station functional processor (DU) may transmit the BH RLF Notification by using a control signal of a layer that is lower than the RRC layer. This is because the base station functional processor (DU) does not have RRC connection with the lower apparatus B. Although the control signal of a layer that is lower than the RRC layer is a MAC Control Element (CE), an RLC Control Protocol Data Unit (PDU), or a Physical Downlink Control Channel (PDCCH), the following will describe an example in which the MAC CE is used.

The base station functional processor (DU) may transmit the BH RLF Notification to the lower apparatus B by unicast. Alternatively, the base station functional processor (DU) may transmit the BH RLF Notification by broadcast or multicast, in order to reduce the signaling load of the BH RLF Notification. When the broadcast or the multicast is used, the lower apparatuses B3 and B4 monitor not only the BH RLF Notification from a connected cell (upper IAB node) but also the BH RLF Notifications of other cells, and can thus receive the BH RLF Notification from the IAB node 300.

For example, the base station functional processor (DU) may transmit the BH RLF Notification by broadcast by using a fixed Radio Network Temporary Identifier (RNTI) that is determined in a specification in advance. The base station functional processor (DU) may transmit the BH RLF Notification by multicast by using a common RNTI that is allocated to a group of lower apparatuses.

Note that the broadcast/multicast and the unicast may be separately used as appropriate. In this case, the base station functional processor (DU) may notify (broadcast), by using the SIB, whether the BH RLF Notification is transmitted by broadcast/multicast or by unicast. Based on the SIB, the lower apparatus B may change a standby mode for the BH RLF Notification, for example, the RNTI to be used for monitoring of the BH RLF Notification.

The base station functional processor (DU) may periodically transmit the BH RLF Notification during the period when the radio link state of the backhaul link is deteriorated, for example, during the period when BH RLF is occurring. In this case, during the period when the BH RLF Notification is periodically transmitted, BH RLF is occurring. Alternatively, the base station functional processor (DU) may transmit the BH RLF Notification when the BH RLF link occurs, and may transmit a notification indicating recovery (BH Recovered) when recovery is made from the BH RLF. The following will mainly describe an example in which occurrence of the BH RLF and recovery from the BH RLF are indicated to the lower apparatus B through periodic transmission of the BH RLF Notification.

The lower apparatus B determines that BH RLF is occurring during the period when the lower apparatus B receives the BH RLF Notification from the IAB node 300. The transmission period of the BH RLF Notification may be configured for the base station functional processor (DU) by the donor apparatus via the user equipment functional processor (MT) of the IAB node 300.

When the BH RLF Notification is transmitted by multicast, in response to receiving the BH RLF Notification, the lower apparatus B may start transmitting ACK/NACK feedback to the IAB node 300, in response to reception of the BH RLF Notification. When the IAB node 300 receives an ACK from all of the lower apparatuses B1 to B3 under the control of the IAB node 300, the IAB node 300 may stop the periodic transmission of the BH RLF Notification.

The lower apparatuses B1 to B3 that have received the BH RLF Notification may perform processing for switching a connection destination or a communication path from the IAB node 300. Examples of the processing include connection reestablishment processing, conditioned handover trigger processing, communication path switch processing, and measurement report processing for handover. Note that when the lower apparatuses B1 to B3 no longer receive the BH RLF Notification from the IAB node 300 (or receive a notification indicating recovery from the BH RLF) after starting the switch processing as described above and before completing the switch processing, the lower apparatuses B1 to B3 determine that the backhaul link of the IAB node 300 has been recovered, and may cancel the switch processing.

For example, the lower apparatuses B1 to B3 that have received the BH RLF Notification perform cell search to search for a cell other than the cell of the IAB node 300, and perform connection reestablishment (RRC Reestablishment) on an appropriate cell. Here, even when the RLF does not occur between the lower apparatuses B1 to B3 and the IAB node 300, the connection reestablishment processing as described above is performed at an early stage.

The connection reestablishment processing may be controlled to be executed in a temporally distributed manner. For example, the lower apparatuses B1 to B3 each determine execution start time of the connection reestablishment processing with the use of a random value or a UE-ID, so that the execution start time of the connection reestablishment processing of each of the lower apparatuses B1 to B3 can be made different, which can thereby prevent concentration of the load. Note that, when the BH RLF Notification is transmitted by unicast, with the base station functional processor (DU) making transmission timing of each BH RLF Notification different, the execution start time of the connection reestablishment processing of each of the lower apparatuses B1 to B3 may be made different.

When the lower apparatuses B1 to B3 that have received the BH RLF Notification are in DC communication with the IAB node 300 and an upper apparatus other than the IAB node 300, to which the lower apparatuses B1 to B3 have been connected, the lower apparatuses B1 to B3 may switch, to another upper apparatus, the communication path routed through the IAB node 300, or may transmit the BH RLF Notification to another communication apparatus. For example, when the lower apparatus B configures the IAB node 300 as a master node (MN), and configures another upper apparatus as a secondary node (SN) for backup, the lower apparatus B switches the communication path via the MN to the SN.

When conditioned handover is configured for the lower apparatuses B1 to B3 that have received the BH RLF Notification, the lower apparatuses B1 to B3 may determine that the condition has been satisfied, and perform handover. When the handover condition is an event indicating radio quality deterioration of the serving cell, handover may be forcibly triggered by modifying radio quality measurement results of the serving cell to be low (for example, regarding as −200 dBm).

The lower apparatuses B1 to B3 that have received the BH RLF Notification may trigger transmission of a measurement report. Here, a general measurement report is transmitted by using an RRC message; however, the base station functional processor (DU) does not include an RRC layer. Thus, the IAB node 300 may store the measurement report from the lower apparatus B until recovery is made from the RLF of the backhaul link, and transfer the measurement report to the donor apparatus when recovery is (temporarily) made from the BH RLF, and the donor apparatus may cause the lower apparatus B to perform handover.

In response to receiving the BH RLF Notification, the lower apparatus B4 may perform processing for excluding the IAB node 300 from candidates for the connection destination. For example, in the cell reselection operation in the RRC idle state or the RRC inactive state, in response to receiving the BH RLF Notification, the lower apparatus B4 may exclude the IAB node 300 from the candidates for the connection destination by lowering the priority of the cell of the IAB node 300, excluding the cell of the IAB node 300 from a reselection target, or adjusting a received power measured value regarding the IAB node 300 to a lower value. Here, in order to adjust the received power measured value to be low, an offset value may be applied to an actual received power measured value. The offset value may be a fixed value that is determined in advance. Alternatively, the offset value may be a value reported from a network, and this may be reported using broadcast information (SIB) of a cell on which the lower apparatus B4 currently camps.

The lower apparatus B4 may perform the processing for excluding the IAB node 300 from the candidates of the connection destination at timing before starting RRC Setup Request processing or RRC Resume Request processing in the case of transitioning to the RRC connected state.

Specifically, before transmitting the RRC Setup Request, the lower apparatus B4 checks whether a cell of a transmission destination candidate has reported the BH RLF Notification. When the cell of the transmission destination candidate has not reported the BH RLF Notification, the lower apparatus B4 transmits the RRC Setup Request. When the cell of the transmission destination candidate has reported the BH RLF Notification, an appropriate RRC Setup Request transmission destination is selected by stopping (or cancelling) transmission of the RRC Setup Request and performing the cell reselection operation.

When the lower apparatus B4 no longer receives the BH RLF Notification from the IAB node 300 (or receives a notification indicating recovery from the BH RLF), the lower apparatus B4 determines that the backhaul link of the IAB node 300 has been recovered, and may cancel the processing for excluding the IAB node 300 from the candidates for the connection destination.

Figure 7:
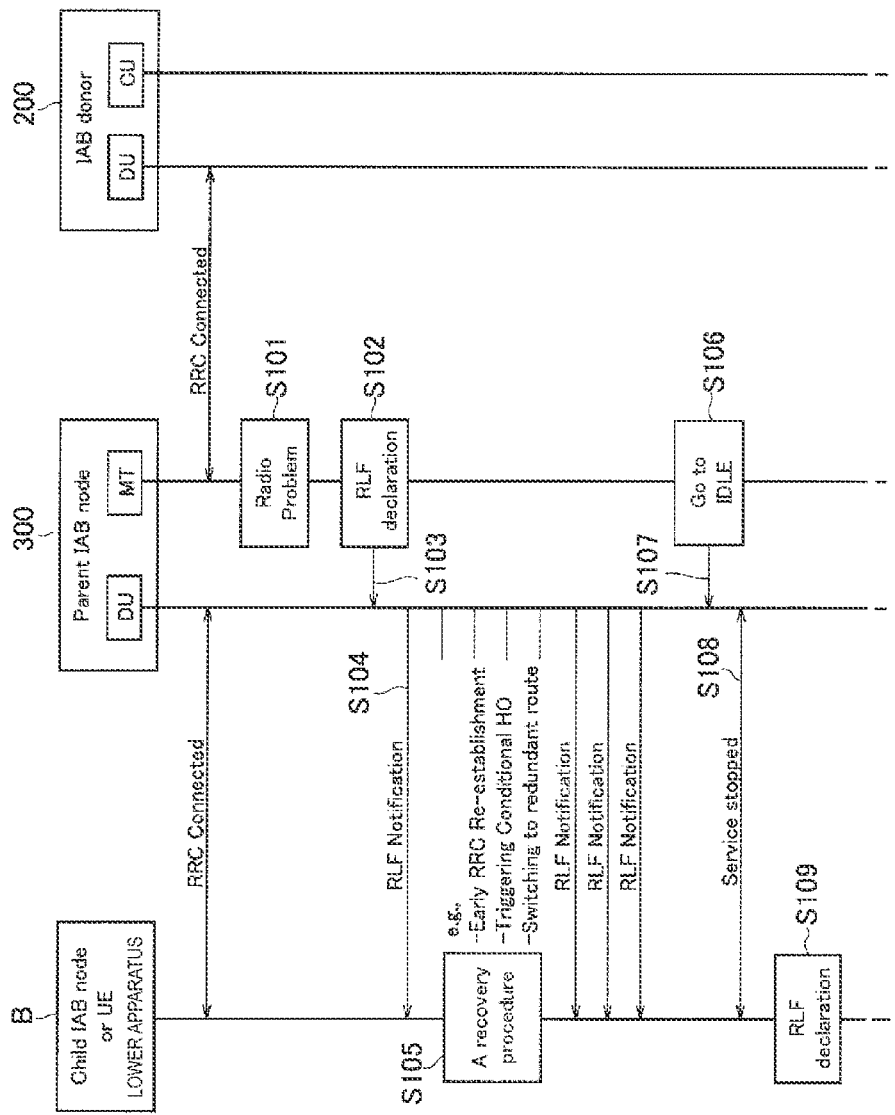
FIG. 7 is a diagram illustrating an example of operations of a mobile communication system according to the first embodiment.

FIG. 7 is a diagram illustrating an example of operations according to the first embodiment. In FIG. 7, another IAB node may be interposed between the IAB node (Parent IAB node) 300 and the donor gNB (IAB doner) 200.

As illustrated in FIG. 7, in Step S101, the user equipment functional processor (MT) of the IAB node 300 detects a radio problem.

In Step S102, the user equipment functional processor (MT) of the IAB node 300 detects a BH RLF (RLF declaration).

In Step S103, the user equipment functional processor (MT) of the IAB node 300 notifies state information indicating occurrence of the BH RLF, to the base station functional processor (DU) of the IAB node 300.

In Step S104, the base station functional processor (DU) of the IAB node 300 starts periodic transmission of the BH RLF Notification, in response to the notification from the user equipment functional processor (MT).

In Step S105, in response to receiving the BH RLF Notification, the lower apparatus B initiates processing for switching the connection destination or the communication path from the IAB node 300. Examples of the processing include connection reestablishment processing (Early RRC Re-establishment), conditioned handover trigger processing (Triggering Conditional HO), and communication path switch processing (Switching to redundant route).

In Step S106, for example, the user equipment functional processor (MT) of the IAB node 300 fails to perform connection reestablishment while T310 is running, and transitions to the RRC idle state in response to expiration of T310 (Go to IDLE).

In Step S107, the user equipment functional processor (MT) of the IAB node 300 notifies state information indicating the transition to the RRC idle state, to the base station functional processor (DU) of the IAB node 300.

In Step S108, the base station functional processor (DU) of the IAB node 300 stops service provision for the lower apparatus B, in response to the notification from the user equipment functional processor (MT) (Service stopped).

In Step S109, in response to the stopping of the service provision from the IAB node 300, the lower apparatus B detects the RLF.

MODIFICATION EXAMPLE 1 OF FIRST EMBODIMENT

Now, a Modification Example 1 of the first embodiment will be described.

In the first embodiment described above, an example has been described in which the IAB node 300 that has detected the BH RLF transmits the BH RLF Notification to the lower apparatus B and in which, in response to receiving the BH RLF Notification, the lower apparatus B initiates processing for switching the connection destination or communication path from the IAB node 300, as illustrated in steps S104 and S105 of FIG. 7.

In this modification example, lower apparatus B stops the uplink transmission for the IAB node 300 in response to receiving the BH RLF Notification from the IAB node 300. Specifically, when the BH RLF has occurred in the IAB node 300, the uplink signal of the lower apparatus B does not reach the donor apparatus 200 even in a case where the wireless state between the IAB node 300 and the lower apparatus B is normal. Thus, the lower apparatus B stops the uplink transmission in response to receiving the BH RLF Notification from the IAB node 300, thus allowing suppression of an increase in power consumption and interference.

Specifically, the communication control method according to the present modification example is a communication control method used in the mobile communication system 1 configured to form at least one communication path with a plurality of the IAB nodes 300 between the UE 100 and the donor apparatus 200, the method including:

1) detecting, by the IAB node 300 included in the plurality of IAB nodes 300, BH RLF between the upper apparatus A higher than the IAB node 300 and the IAB node 300, 2) in response to detecting the BH RLF, transmitting, by the IAB node 300, the failure notification related to the BH RLF (BH RLF Notification) to the lower apparatus B lower than the IAB node 300, and 3) by the lower apparatus B, in response to receiving the BH RLF Notification from the IAB node 300, stopping the uplink transmission for the IAB node 300.

The lower apparatus B may stop the uplink transmission for the IAB node 300 and initiate processing for switching the connection destination or communication path from the IAB node 300. Alternatively, the lower apparatus B may wait for recovery from the BH RLF with the uplink transmission for the IAB node 300 stopped, and when the recovery from the BH RLF is not achieved even a certain period of time later, the lower apparatus B may initiate the processing for switching the connection destination or communication path from the IAB node 300.

The stopping of the uplink transmission in the lower apparatus B includes at least one of the following a) to e).

a) Stop transmission of the Scheduling Request (SR) from the lower apparatus B to the IAB node 300:

"Scheduling request" refers to a signal requesting allocation of uplink radio resources. In response to receiving the BH RLF Notification from the IAB node 300, the lower apparatus B stops (inhibits) the transmission of the scheduling transmission for the IAB node 300.

b) Stop Physical Uplink Shared Channel (PUSCH) transmission from the lower apparatus B to the IAB node 300:

in response to receiving the BH RLF Notification from the IAB node 300, the lower apparatus B stops (inhibits) the PUSCH transmission even when an uplink radio resource (PUSCH resource) is allocated by the IAB node 300, i.e., even when uplink grant is received from the IAB node 300, without applying the allocation. In other words, in response to receiving the BH RLF Notification from the IAB node 300, the lower apparatus B stops (inhibits) the transmission of uplink data and uplink RRC signaling.

c) Suspend the radio bearer of the lower apparatus B:

"Suspending the radio bearer" refers to stopping (inhibiting) the use of the radio bearer while maintaining the radio bearer configuration. In response to receiving the BH RLF Notification from the IAB node 300, the lower apparatus B may suspend all of the radio bearers corresponding to the IAB node 300, and suspend the data radio bearer while continuing to use the signaling radio bearer in the radio bearers.

d) Stop PUCCH transmission from the lower apparatus B to the IAB node 300:

this may include stopping of the SR transmission by the MAC layer described in a) and stopping of feedback of Channel State Information (CSI) by the PHY layer or the like.

e) Stop PRACH transmission from the lower apparatus B to the IAB node 300 or restrict (inhibit) the initiation of a random access procedure.

In the present modification example, the lower apparatus B may determine that the IAB node 300 has been recovered from the BH RLF and resume the uplink transmission in response to the determination.

For example, under the assumption that the IAB node 300 transmits a notification (RLF Recovered) indicating recovery from the BH RLF to the lower apparatus B, the lower apparatus B determines that the IAB node 300 has recovered from the BH RLF in response to receiving RLF Recovered, and resumes the uplink transmission.

On the other hand, under the assumption that the IAB node 300 periodically (continuously) transmits the BH RLF Notification to the lower apparatus B during the BH RLF ongoing, in response to stopping of transmission of the BH RLF Notification, the lower apparatus B determines that the IAB node 300 has recovered from the BH RLF, and resumes the uplink transmission. In this regard, when the lower apparatus B has not received the BH RLF Notification, the lower apparatus B may determine that the transmission of BH RLF Notification is stopped. For example, when the BH RLF Notification is not received at a predetermined timing, the determination is made. In this regard, the predetermined timing may be a transmission period when the transmission is periodically performed.

Note that stopping of transmission of the BH RLF Notification includes, for example, a case in which the transmission is already stopped when the lower apparatus B expresses the desire for transmission of the scheduling request and a case in which the BH RLF Notification is stopped after the desire for transmission of the scheduling request is expressed and before the next BH RLF Notification timing.

Figure 8:
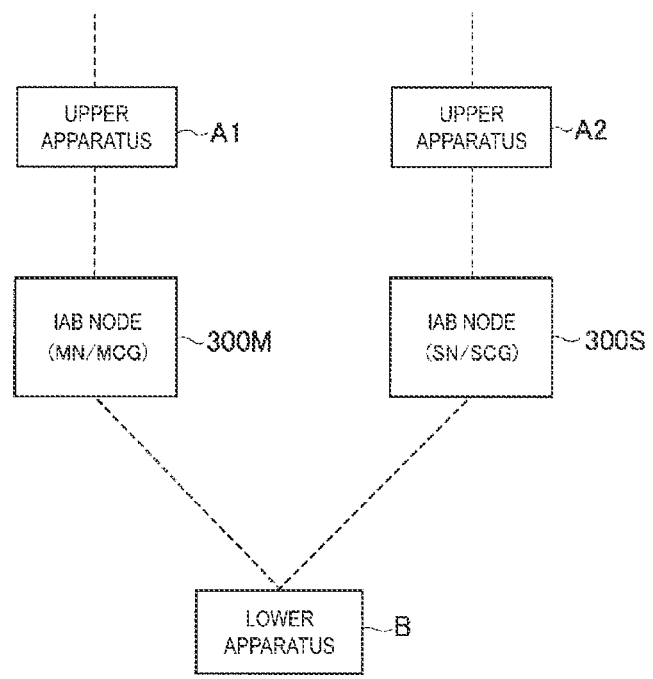
FIG. 8 is a diagram illustrating a configuration in which dual connectivity is applied in Modification Example 1 of the first embodiment.

As described in a second embodiment in detail, dual connectivity (DC) may be applied in the mobile communication system 1. FIG. 8 is a diagram illustrating a configuration in which the dual connectivity is applied in the present modification example.

In the configuration illustrated in FIG. 8, the lower apparatus B is in dual connectivity communication with the IAB node 300M used as a master node (MN) and the IAB node 300S used as a secondary node (SN). One or a plurality of cells allocated to the lower apparatus B by the MN are referred to as a master cell group (MCG). One or a plurality of cells allocated to the lower apparatus B by the SN are referred to as a secondary cell group (SCG).

In FIG. 8, an upper apparatus A1 of the IAB node 300M and an upper apparatus A2 of the IAB node 300S are the IAB nodes 300 or the gNB 200. The lower apparatus B is the IAB node 300 or UE 100.

In the context of such dual connectivity, the IAB node 300M, used as the MN, transmits the BH RLF Notification to the lower apparatus B in response to detecting BH RLF between the IAB node 300M and the upper apparatus A1. In response to receiving the BH RLF Notification from the IAB node 300M, used as the MN, the lower apparatus B stops the uplink transmission for the IAB node 300M and stops the uplink transmission for the IAB node 300S, used as the SN. In other words, when the MN detects the BH RLF, the lower apparatus B stops all of the uplink transmission (uplink transmission to the MCG and SCG).

On the other hand, the IAB node 300S, used as the SN, transmits the BH RLF Notification to the lower apparatus B in response to detecting BH RLF between the IAB node 300S and the upper apparatus A2. In response to receiving the BH RLF Notification from the IAB node 300S, used as the SN, the lower apparatus B stops the uplink transmission for the IAB node 300S, used as the SN, without stopping the uplink transmission for the IAB node 300M, used as the MN. In other words, when the SN detects the BH RLF, the lower apparatus B only stops the uplink transmission for the SN (uplink transmission to the SCG).

MODIFICATION EXAMPLE 2 OF FIRST EMBODIMENT

Now, a Modification Example 2 of the first embodiment will be described.

In the above-described embodiment, an example has been described in which the IAB node 300 transmits the BH RLF Notification in the MAC layer. In the present modification example, in response to receiving the BH RLF Notification as described above, the lower apparatus B notifies the upper layer of the BH RLF Notification received in the MAC layer.

Specifically, the communication control method according to the present modification example is a communication control method used in the mobile communication system 1 configured to form at least one communication path with a plurality of IAB nodes 300 between the UE 100 and the donor apparatus 200, the method including:

1) detecting, by the IAB node 300 included in the plurality of IAB nodes 300, BH RLF between the upper apparatus A higher than the IAB node 300 and the IAB node 300, 2) in response to detecting the BH RLF, transmitting, by the MAC layer of the IAB node 300, the failure notification related to the BH RLF (BH RLF Notification) to the lower apparatus B lower than the IAB node 300, and 3) by the MAC layer of the lower apparatus B, in response to receiving the failure notification from the IAB node 300, notifying the upper layer of the lower apparatus B that the failure notification has been received.

Figure 9A:
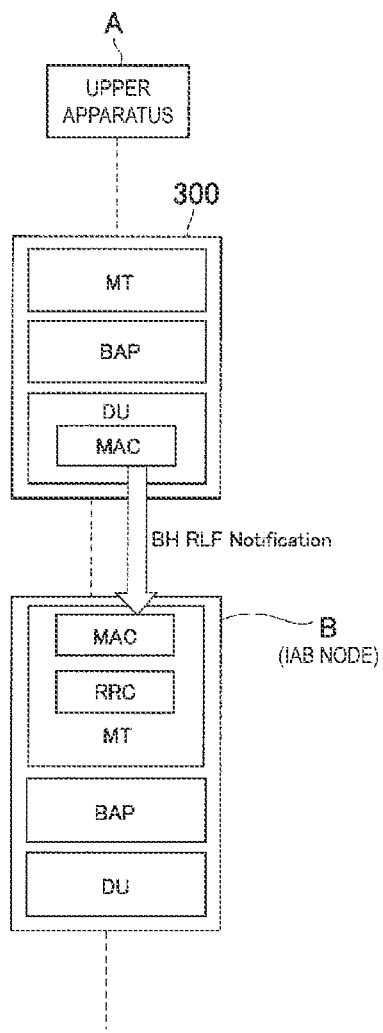
FIG. 9A is a diagram illustrating operations according to Modification Example 2 of the first embodiment.
Figure 9B:
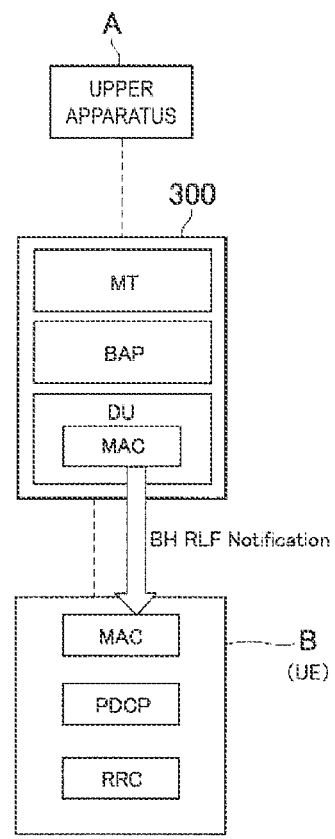
FIG. 9B is a diagram illustrating operations according to Modification Example 2 of the first embodiment.

FIG. 9A and FIG. 9B are a diagram illustrating operations according to the present modification example. FIG. 9A illustrates an example in which the lower apparatus B is the IAB node 300. FIG. 9B illustrates an example in which the lower apparatus B is the UE 100. The upper apparatus A may be the IAB node 300 or the gNB200 (donor apparatus).

As illustrated in FIG. 9A, the IAB node 300 includes an MT, a BAP layer, and a DU. At least a portion of the BAP layer may be included in the MT or included in the DU. The DU of the IAB node 300 include a MAC layer. The DU also includes a PHY layer and an RLC layer, which are not illustrated. The MT of the lower apparatus B (lower IAB node) includes a MAC layer and an RRC layer. The DU also includes a PHY layer and an RLC layer, which are not illustrated.

As illustrated in FIG. 9B, the IAB node 300 is configured as in the case of FIG. 9A. The lower apparatus B (UE 100) includes a MAC layer, a PDCP layer, and an RRC layer. The UE 100 also includes a PHY layer and an RLC layer that are not illustrated.

In the configuration as illustrated in FIG. 9A and FIG. 9B, when the MT of the IAB node 300 detects BH RLF, the MAC layer of the DU of the IAB node 300 transmits the BH RLF Notification to the lower apparatus B in response to detecting BH RLF. The BH RLF Notification may be included in a MAC Control Element (CE). In response to receiving the BH RLF Notification, the MAC layer of the lower apparatus B notifies the upper layer of the lower apparatus B that the BH RLF Notification has been received. The notification to the upper layer may be a notification indicating that BH RLF is detected at the IAB node 300, or may be a notification that the corresponding communication path (or the radio link between the IAB node 300 and the lower apparatus B) is disabled.

The upper layer to be notified from the MAC layer in the lower apparatus B includes at least one of an RRC layer, a BAP layer, and a PDCP layer. The upper layer may perform processing as described in the first embodiment, i.e., switching the connection destination or communication path from the IAB node 300, or may stop the processing described in Modification Example 1 of the first embodiment, i.e., the uplink transmission.

In the lower apparatus B, in response to receiving the notification from the MAC layer, the RRC layer performs at least one of the following processing operations, for example.

Stop the uplink transmission (see Modification Example 1 of the first embodiment).

Make an attempt to establish a redundancy link. For example, when the lower apparatus B is a lower IAB node, and the lower IAB node has a plurality of MTs, the RRC layer establishes a link by using an MT other than the MT having received the BH RLF Notification.

The RRC layer performs RRC re-establishment processing (RRC Reestablishment) on another cell (another upper apparatus).

When the lower apparatus B has dual connectivity and the lower apparatus B receives the BH RLF Notification from the SN (SCG), the RRC layer transmits a notification (SCG Failure Indication) to the MN (MCG).

When the lower apparatus B has dual connectivity and the lower apparatus B receives the BH RLF Notification from the MN (MCG), the RRC layer transmits a notification (MCG Failure Indication) to the SN (SCG).

In the lower apparatus B, in response to receiving the notification from the MAC layer, the BAP layer or PDCP layer transfers (reroutes) buffered upstream data to another link when the lower apparatus B has dual connectivity. For example, when the lower apparatus B receives BH RLF Notification from the SN (SCG), the BAP layer or PDCP layer transfers the upstream data to the MN (MCG). On the other hand, when the lower apparatus B receives the BH RLF Notification from the MN (MCG), the BAP layer or PDCP layer transfers the upstream data to the SN (SCG). Alternatively, the BAP layer or PDCP layer stops transmission of the upstream data to an RLC channel (i.e., an RLC entity) for which a link to a root (upper node) at which BH RLF is occurring is established.

Note that in the present modification example, an example has been described in which the BH RLF Notification is transmitted and/or received in the MAC layer, but the BH RLF Notification may be transmitted and/or received in the RRC layer, for example. Under such assumptions, in response to receiving the BH RLF Notification, the RRC layer of the lower apparatus B notifies other layers (e.g., the BAP layer and/or MAC layer) that the BH RLF Notification has been received.

Alternatively, the BH RLF Notification may be transmitted and/or received in the BAP layer. Under such assumptions, in response to receiving the BH RLF Notification, the BAP layer of the lower apparatus B notifies other layers (e.g., the RRC layer and/or MAC layer) that the BH RLF Notification has been received.

MODIFICATION EXAMPLE 3 OF FIRST EMBODIMENT

Now, Modification Example 3 of the first embodiment will be described.

In the first embodiment described above, as illustrated in step S104 of FIG. 7, an example has been described in which the IAB node 300 periodically (continuously) transmits the BH RLF Notification during the period when BH RLF is occurring. This transmission period may be a constant period defined in the specification of the mobile communication system 1, but in the present modification example, the transmission period is assumed to be variable.

Specifically, the communication control method according to the present modification example is a communication control method used in the mobile communication system 1 configured to form at least one communication path with a plurality of IAB nodes 300 between the UE 100 and the donor apparatus 200, the method including:

1) detecting, by the IAB node 300 included in the plurality of IAB nodes 300, BH RLF between the upper apparatus A higher than the IAB node 300 and the IAB node 300, 2) in response to detecting the BH RLF, by the IAB node 300, repeatedly transmitting the failure notification related to the BH RLF (BH RLF Notification) to the lower apparatus B lower than the IAB node 300, and 3) by the IAB node 300, transmitting to lower apparatus B timing information related to the timing for the repeated transmission of the failure notification.

This allows the transmission period of the failure notification (BH RLF Notification) to be made variable. A reduced period leads to frequent transmission, and thus, when the upper node recovers from the BH RLF, the lower node can promptly recognize the recovery, and can advantageously quickly perform recovery operations such as UL transmission resumption. On the other hand, there is a disadvantage that the power consumption required for transmission/reception is increased or interference increases. An increased period reverses the above-described advantages and disadvantages. Thus, the transmission period of the failure notification (BH RLF Notification) may be adjusted to an optimal value in accordance with a network design policy.

Note that repeated transmission may be periodic transmission or aperiodic transmission. When the BH RLF Notification is periodically transmitted, the timing information transmitted by the IAB node 300 includes information indicating the transmission period of the BH RLF Notification. When the BH RLF Notification is aperiodically transmitted, the timing information transmitted by the IAB node 300 may include information indicating a subframe number corresponding to the transmission timing for the BH RLF Notification.

The IAB node 300 may transmit, by broadcast, an SIB including the timing information. Alternatively, the donor apparatus may transmit an RRC message (RRC Reconfiguration message) including timing information, to the lower apparatus B via the IAB node 300.

Alternatively, the IAB node 300 may transmit the timing information to the lower apparatus B along with the BH RLF Notification. Specifically, the IAB node 300 transmits the BH RLF Notification including the timing information. For example, the timing information included in one BH RLF Notification may include information indicating the subframe number corresponding to the next transmission timing for the BH RLF Notification. Note that, as described above, the BH RLF Notification may be transmitted and/or received in the MAC layer.

In response to detecting BH RLF, the IAB node 300 may repeatedly transmit the BH RLF Notification to the lower apparatus B during the period when an attempt is made to re-establish the backhaul link. Specifically, in response to detecting BH RLF, even if the RRC re-establishment of the backhaul link fails, the IAB node 300 continues to transmit the BH RLF Notification during the period when the RRC re-establishment of the backhaul link is continuously attempted. Then, when the RRC re-establishment is not successful during this period, the DU of the IAB node 300 stops the transmission of the BH RLF Notification and stops the service provision for the lower apparatus B (i.e., stops PSS/SSS/MIB/SIB1). The MT of the IAB node 300 transitions to the RRC idle state.

Second Embodiment

Now, a second embodiment will be described assuming operations according to the first embodiment and the modification examples of the first embodiment. However, differences from the first embodiment will be mainly described, and duplicate descriptions of the first embodiment will be omitted.

The second embodiment is an embodiment that assumes dual connectivity (DC), and can be used in conjunction with operations according to the first embodiment and the modification examples of the first embodiment.

OPERATION EXAMPLE 1

Figure 10:
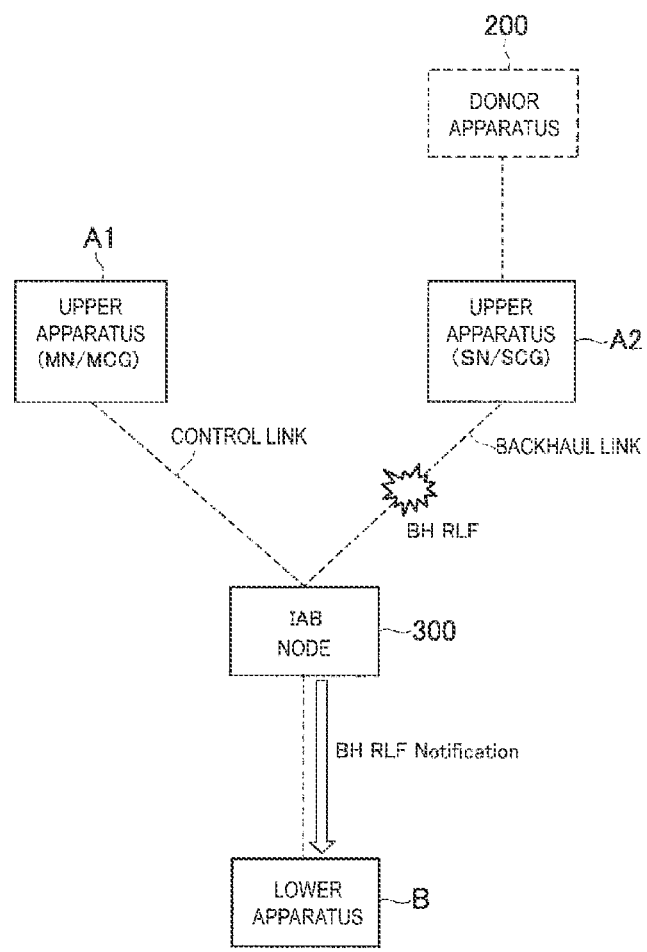
FIG. 10 is a diagram illustrating Operation Example 1 of a second embodiment.

FIG. 10 is a diagram illustrating Operation Example 1 of the second embodiment.

As illustrated in FIG. 10, the IAB node 300 is in dual connectivity communication with the upper apparatus A1 used as the MN and the upper apparatus A2 used as the secondary node (SN). The lower apparatus B is connected to the IAB node 300 wirelessly. The lower apparatus B is the lower IAB node or the UE.

The IAB node 300 establishes a control link for the upper apparatus A1 to control the IAB node 300 without establishing a backhaul link for the communication path between the IAB node 300 and the upper apparatus A1, used as the MN. The IAB node 300 establishes a backhaul link for the communication path between the upper apparatus A2, used as the SN, and the IAB node 300.

When the IAB node 300 with dual connectivity establishes both a backhaul link with the MN and a backhaul link with the SN, then even in a case where BH RLF occurs in the backhaul link with the SN, the IAB node 300 may not need to transmit the BH RLF Notification to the lower apparatus B as long as the BH RLF is maintained in the backhaul link with the MN. This is because, even when BH RLF occurs in the backhaul link with the SN, the lower apparatus B may maintain the connection with the IAB node 300 so long as the backhaul link with the MN is maintained.

On the other hand, when the IAB node 300 with dual connectivity does not establish a backhaul link with the MN, the IAB node 300 cannot transmit and/or receive the data of the lower apparatus B to and/or from the MN. Thus, when BH RLF occurs in the backhaul link with the SN, the lower apparatus B fails to transmit and/or receive data through the IAB node 300, and thus the IAB node 300 should transmit the BH RLF Notification to the lower apparatus B.

Specifically, the communication control method according to the present operation example is a communication control method used in the mobile communication system 1 configured to form at least one communication path with a plurality of IAB nodes 300 between the UE 100 and the donor apparatus 200, the method including:

1) performing, by the IAB node 300 included in the plurality of IAB nodes 300, dual connectivity communication with the upper apparatus A2 higher than the IAB node 300 used as the SN and with the other apparatus (upper apparatus A1) used as the MN,
2) establishing a backhaul link between the IAB node 300 and the SN without establishing a backhaul link for the communication path between the IAB node 300 and the MN, and
3) detecting, by the IAB node 300, BH RLF between the IAB node 300 and the SN, and in response to the detecting of the BH RLF, transmitting, by the IAB node 300, the failure notification related to the BH RLF (BH RLF Notification) to the lower apparatus B lower than the IAB node 300.

Specifically, in the present operation example, the IAB node 300 being in dual connectivity communication determines whether to transmit the failure notification to the lower apparatus B depending on whether a backhaul link is established between the MN and the IAB node 300. Specifically, when no backhaul link is established between the IAB node 300 and the MN, the IAB node 300 determines to transmit the failure notification to the lower apparatus B in response to detecting BH RLF between the IAB node 300 and the SN. On the other hand, when a backhaul link is established between the MN and the IAB node 300, the IAB node 300 determines not to transmit the failure notification to the lower apparatus B even in response to detecting BH RLF between the IAB node 300 and the SN.

In the present operation example, dual connectivity (DC) using LTE and NR, i.e., Evolved Universal Terrestrial Radio Access (E-UTRA)-NR Dual Connectivity (EN-DC) may be assumed. Under such assumptions, the MN (upper apparatus A1) is an LTE apparatus, and the SN (upper apparatus A2) is an NR apparatus. For example, the MN (upper apparatus A1) is an eNB used as an LTE base station, and the SN (upper apparatus A2) is a gNB (donor apparatus 200) or an upper IAB node used as an NR base station.

In the present operation example, dual connectivity (DC) using only NR, i.e., NR Dual Connectivity (NR-DC) may be assumed. Under such assumptions, the MN (upper apparatus A1) is an NR apparatus, and the SN (upper apparatus A2) is also an NR apparatus. For example, the MN (upper apparatus A1) is a gNB or an upper IAB node, which is a NR base station, and the SN (upper apparatus A2) is a gNB or an upper IAB node, which is the NR base station.

In the present operation example, the IAB node 300 may receive, from the donor apparatus 200, configuration information indicating whether the IAB node 300 is used as a backhaul link, and establish and identify the backhaul link based on this configuration information. The configuration information may be information indicating whether each Cell Group (CG) or each bearer is used for the backhaul link.

OPERATION EXAMPLE 2

Figure 11:
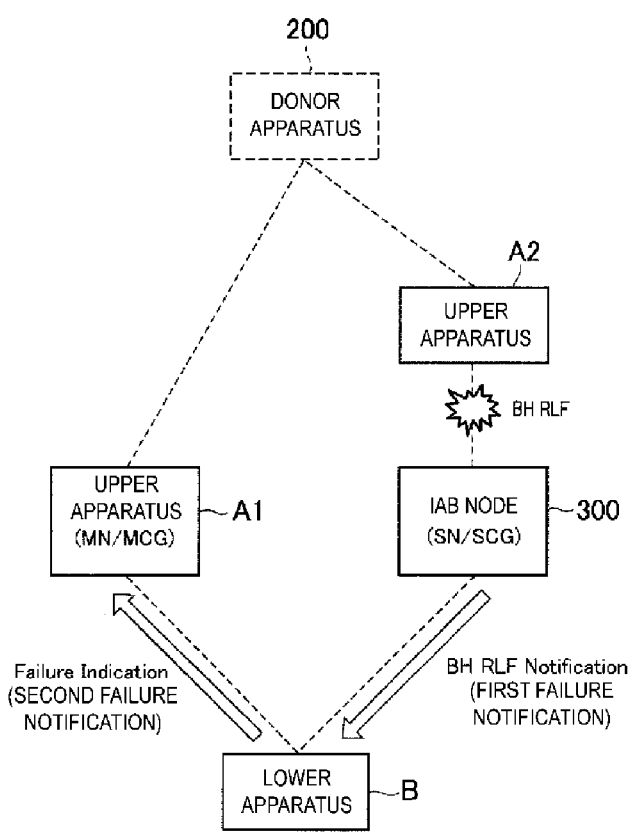
FIG. 11 is a diagram illustrating Operation Example 2 of the second embodiment.

FIG. 11 is a diagram illustrating Operation Example 2 of the second embodiment.

As illustrated in FIG. 11, the lower apparatus B is in dual connectivity communication with the upper apparatus A1 used as the MN and the IAB node 300 used as the secondary node (SN). The lower apparatus B is the lower IAB node or the UE. Under such assumptions, in response to detecting BH RLF between the IAB node 300 and the upper apparatus A2 of the IAB node 300, the IAB node 300 transmits the BH RLF Notification to the lower apparatus B. In this case, the MN (upper apparatus A1) can preferably recognize that BH RLF has occurred in the IAB node 300, used as the SN. Note that the upper apparatus A1 is an IAB node or a base station and that the upper apparatus A2 is an IAB node or a base station (donor apparatus 200).

Specifically, the communication control method according to the present operation example is a communication control method used in the mobile communication system 1 configured to form at least one communication path with a plurality of IAB nodes 300 between the UE 100 and the donor apparatus 200, the method including:
1) performing, by the lower apparatus B lower than the IAB node 300, dual connectivity communication with the IAB node 300 being the SN and the other apparatus (upper apparatus A1) being the MN,
2) by the IAB node 300, in response to detecting BH RLF between the upper apparatus (upper apparatus A2) of the IAB node 300 and the IAB node 300, transmitting a first failure notification (BH RLF Notification) to the lower apparatus B, and
3) by the lower apparatus B, in response to receiving the first failure notification from the IAB node 300 being the SN, transmitting to the MN a second failure notification (Failure Indication) indicating BH RLF in the SN.

Note that, in response to detecting RLF between the lower apparatus B and the IAB node 300, the lower apparatus B may transmit SCG Failure Indication to the MN. On the other hand, when BH RLF occurs between the IAB node 300 and the upper apparatus A2 in spite of detection of no RLF between the lower apparatus B and the IAB node 300, the second failure notification (Failure Indication) is transmitted from the lower apparatus B to the MN. Note that the second failure notification (Failure Indication) may be an information element in the SCG Failure Indication message or a message different from the SCG Failure Indication message.

The lower apparatus B may include "BH RLF" in the second failure notification (Failure Indication) as information indicating the cause of the SCG failure (Cause). The second failure notification (Failure Indication) may include an identifier indicating the IAB node 300 or the cell of the IAB node 300.

In response to receiving the second failure notification (Failure Indication) from the lower apparatus B, the upper apparatus A1 (MN) performs processing such as Secondary Node (SN) Change in order to re-connect the link on the IAB node 300 side, used as the SN, to another upper apparatus. The upper apparatus A1 (MN) may determine, based on the second failure notification (Failure Indication), that the DC configuration has been disconnected (has failed), and may perform processing for releasing a UE context in the IAB node 300, used as the SN. For example, a UE context release message is transmitted from the upper apparatus A1 (MN) to the IAB node 300 (SN) via an interface between the upper apparatus A1 (MN) and the IAB node 300 (SN).

OPERATION EXAMPLE 3

Figure 12:
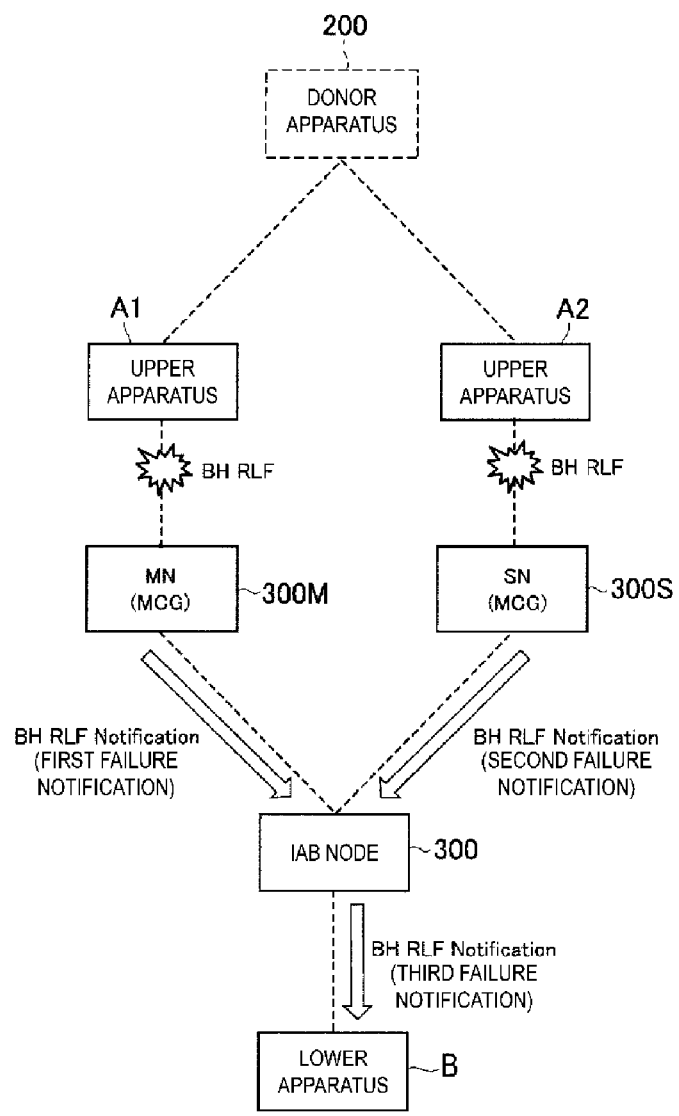
FIG. 12 is a diagram illustrating Operation Example 3 of the second embodiment.

FIG. 12 is a diagram illustrating Operation Example 3 of the second embodiment.

As illustrated in FIG. 12, the IAB node 300 is in dual connectivity communication with the MN 300M and the SN 300S. Each of the MN 300M and the SN 300S is an upper IAB node. When the MN 300M detects BH RLF between the MN 300M and the upper apparatus A1 thereof, the MN 300M transmits the BH RLF Notification to the IAB node 300. When the SN 300S detects BH RLF between the SN 300S and the upper apparatus A2 thereof, the SN 300S transmits the BH RLF Notification to the IAB node 300. Each of the upper apparatuses A1 and A2 is an upper IAB node or a base station. Note that it is assumed that no RLF has occurred in an MCG link corresponding to the link between the IAB node 300 and MN 300M and that no RLF has occurred in an SCG link corresponding to the link between the IAB nodes 300 and SN 300S.

Under such assumptions, the IAB node 300 transmits the BH RLF Notification to the lower apparatus B only when the IAB node 300 receives the BH RLF Notification from both the MN 300M and the SN 300S. In other words, the IAB node 300 does not transmit the BH RLF Notification to the lower apparatus B when the IAB node 300 receives BH RLF Notification from only one of the MN 300M and the SN 300S.

Specifically, the communication control method according to the present operation example is a communication control method used in the mobile communication system 1 configured to form at least one communication path with a plurality of IAB nodes 300 between the UE 100 and the donor apparatus 200, the method including:
1) performing, by the IAB node 300 included in the plurality of IAB nodes 300, dual connectivity communication with the MN 300M and the SN 300S,
2) by the MN 300M, in response to detecting BH RLF between the upper apparatus A1 of the MN 300M and the MN 300M, transmitting the first failure notification (BH RLF Notification) to the IAB node 300, 3) by the SN 300S, in response to detecting BH RLF between the upper apparatus A2 of the SN 300S and the SN 300S, transmitting the second failure notification (BH RLF Notification) to the IAB node 300, and 4) by the IAB node 300, in response to receiving both the first and second failure notifications, transmitting a third failure notification (BH RLF Notification) to the lower apparatus B lower than the IAB node 300.

In this regard, the IAB node 300 transmits the third failure notification (BH RLF Notification) to the lower apparatus B when the IAB node 300 receives both the first and second failure notifications even in a case where no RLF is occurring between the IAB node 300 and the MN 300M and between the IAB node 300 and SN 300S. In other words, the IAB node 300 transmits the third failure notification (BH RLF Notification) to the lower apparatus B when BH RLF is detected in both the MN 300M and the SN 300S even in a case where the IAB node 300 is in a favorable wireless state.

The IAB node 300 may consider that BH RLF has occurred in the IAB node 300 when the IAB node 300 receives both the first and second failure notifications. By considering that BH RLF has occurred, the IAB node 300 consequently transmits the BH RLF Notification to the lower apparatus B. By considering that BH RLF has occurred, the IAB node 300 may perform an operation such as RRC re-establishment for another upper apparatus.

In the present operation example, when the IAB node 300 receives both the first and second failure notifications and determines that a state with the backhaul communication of the IAB node 300 not recovered has continued for a certain period of time, the IAB node 300 may transmit the third failure notification to the lower apparatus B. Specifically, instead of receiving both the first failure notification and the second failure notification and immediately transmitting the third failure notification to the lower apparatus B, the IAB node 300 transmits the third failure notification to the lower apparatus B after confirming that the backhaul communication of the IAB node 300 is not recovered within a certain period of time after reception of both the first failure notification and the second failure notification. On the other hand, in response to determining that the backhaul communication of the IAB node 300 has been recovered within the certain period of time after reception of both the first failure notification and the second failure notification, the IAB node 300 does not transmit the third failure notification to the lower apparatus B.

Figure 13:
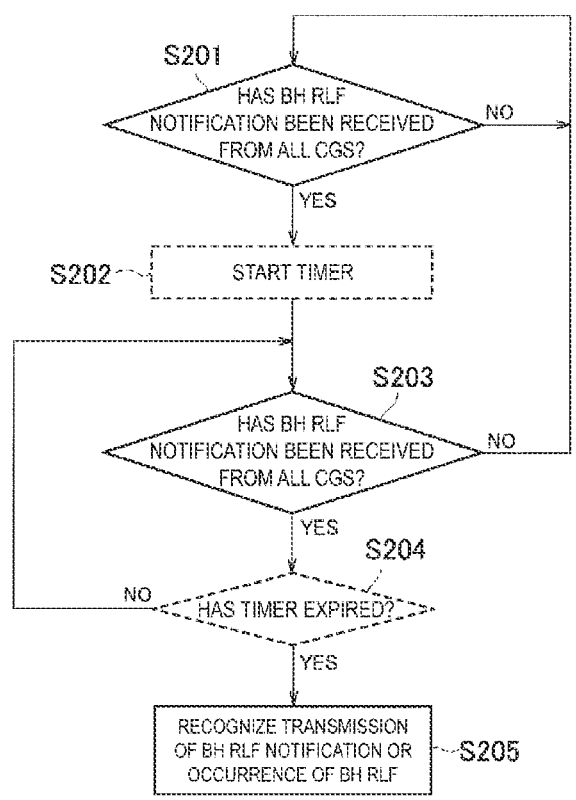
FIG. 13 is an operational flow diagram of a relay apparatus according to Operation Example 3 of the second embodiment.

FIG. 13 is an operational flow diagram of the IAB node 300 in the present operation example. Here, each of the MN 300M and the SN 300S is assumed to periodically (continuously) transmit the BH RLF Notification during the period when BH RLF is detected.

As illustrated in FIG. 13, in step S201, the IAB node 300 determines whether the IAB node 300 has received the BH RLF Notification from both the MN 300M (MCG) and the SN 300S (SCG), in other words, from all of the CGs.

In response to receiving the BH RLF Notification from all of the CGs (step S201: Yes), in step S202 the IAB node 300 starts a timer corresponding to the certain period of time. The value of the timer may be configured for the IAB node 300 by the MN 300M or the upper apparatus A1 (e.g., the donor apparatus).

In step S203, the IAB node 300 determines whether the IAB node 300 has been continuously receiving the BH RLF Notification from both the MN 300M (MCG) and the SN 300S (SCG), i.e., from all of the CGs. In the case of "No" in step S203, the processing returns to step S201.

In the case of "Yes" in step S203, then in step S204, the IAB node 300 determines whether the timer activated in step S202 has expired. In the case of "No" in step S204, the processing returns to step S203.

In the case of "Yes" in step S204, then in step S205, the IAB node 300 transmits the BH RLF Notification to the lower apparatus B. Alternatively, in the case of "Yes" in step S204, then in step S205, the IAB node 300 may consider that BH RLF has occurred in the IAB node 300.

In FIG. 13, each of the MN 300M and the SN 300S is assumed to periodically (continuously) transmit the BH RLF Notification during the period when BH RLF is detected. However, as described in the first embodiment, each of the MN 300M and the SN 300S may transmit the notification indicating recovery (BH Recovered) in response to recovery from the BH RLF.

Under the assumption that such a notification (BH Recovered) is used, in step S203, the IAB node 300 may determine whether the IAB node 300 has received BH Recovered from at least one of the CGs. Then, in response to receiving BH Recovered from at least one of the CGs, the IAB node 300 returns the processing to step S201. On the other hand, when the IAB node 300 has not received BH Recovered from any of the CGs, the IAB node 300 advances the processing to step S204.

The case of determining "No" in step S203 in FIG. 13 includes a case in which the IAB node 300 has succeeded in RRC re-establishment on another upper apparatus after receiving the BH RLF Notification from both CGs.

OPERATION EXAMPLE 4

Figure 14:
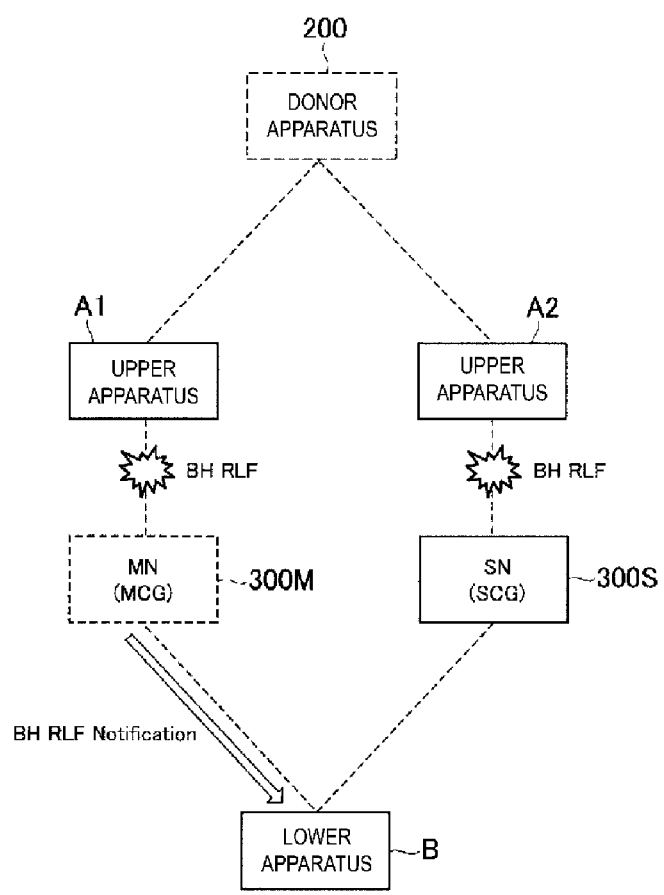
FIG. 14 is a diagram illustrating Operation Example 4 of the second embodiment.

FIG. 14 is a diagram illustrating Operation Example 4 of the second embodiment.

As illustrated in FIG. 14, the lower apparatus B is in dual connectivity (NR-DC) communication with the MN 300M and the SN 300S. The lower apparatus B is an IAB node or a UE. Each of the MN 300M and the SN 300S is an IAB node. A backhaul link is established between the MN 300M and the upper apparatus A1, and a backhaul link is established between the SN 300S and the upper apparatus A2.

In the present operation example, when both the MN (MCG) and the SN (SCG) are configured for the backhaul link, transmission of the BH RLF Notification is permitted only for the MN (MCG).

Specifically, the communication control method according to the present operation example is a communication control method used in the mobile communication system 1 configured to form at least one communication path with a plurality of IAB nodes 300 between the UE 100 and the donor apparatus 200, the method including:

1) performing, by the lower apparatus B, dual connectivity communication with the MN 300M and SN 300S included in the plurality of IAB nodes 300, 2) in response to detecting, by the MN 300M, BH RLF between the upper apparatus A1 and MN 300M, transmitting, by the MN 300M, the first failure notification (BH RLF Notification) to the lower apparatus B, and 3) in response to detecting, by the SN 300S, BH RLF between the upper apparatus A2 of the SN 300S and the SN 300S, transmitting, by the MN 300M, the second failure notification (BH RLF Notification) to the lower apparatus B.

In the present operation example, in response to occurrence of BH RLF in the SN 300S, the SN 300S uses the interface between the MN 300M and the SN 300S to transmit, from SN 300S to the MN 300M, information related to the BH RLF of the SN 300S. When the upper apparatus A2 of the SN 300S can detect the BH RLF of SN 300S, information related to the BH RLF of the SN 300S may be transmitted from the upper apparatus A2 to the MN 300M via the donor apparatus 200.

In this regard, the first failure notification (BH RLF Notification) includes information indicating the occurrence of BH RLF of the MN 300M, and the second failure notification (BH RLF Notification) includes information indicating the occurrence of BH RLF of the SN 300S. Thus, even when the transmission of BH RLF Notification is transmitted only by the MN 300M, the lower apparatus B can determine whether the BH RLF has occurred in the MN 300M or the SN 300S, based on the information included in the BH RLF Notification.

In the present operation example, the SN 300S determines whether the MN 300M includes a backhaul link based on the notification from the donor apparatus 200 (CU) or the notification from the MN 300M. When the MN 300M includes a backhaul link, the SN 300S inhibits the transmission of the BH RLF Notification from the SN 300S to the lower apparatus B. On the other hand, when the MN 300M includes no backhaul link, the SN 300S allows the transmission of the BH RLF Notification from the SN 300S to the lower apparatus B.

OPERATION EXAMPLE 5

Figure 15:
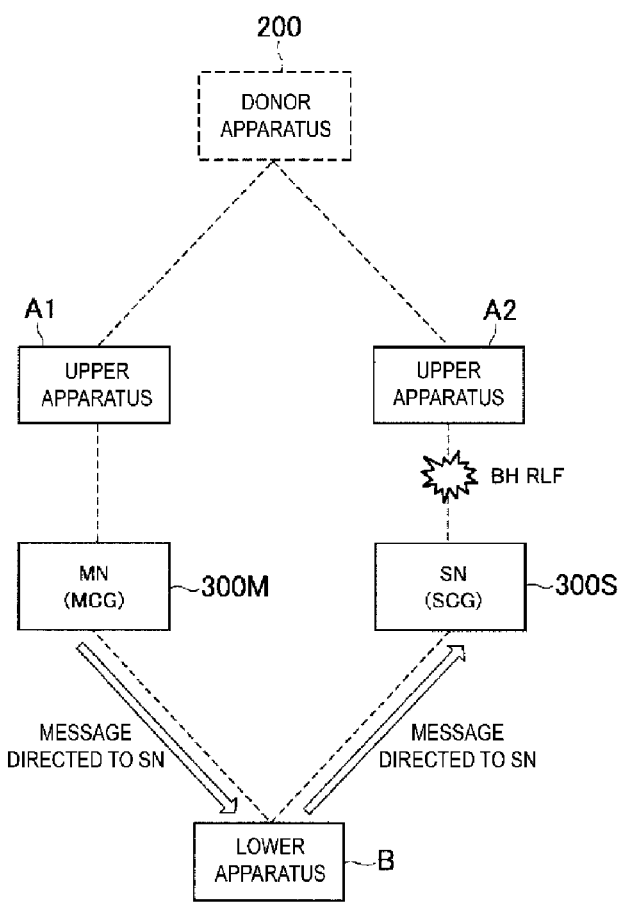
FIG. 15 is a diagram illustrating Operation Example 5 of the second embodiment.
Figure 16:
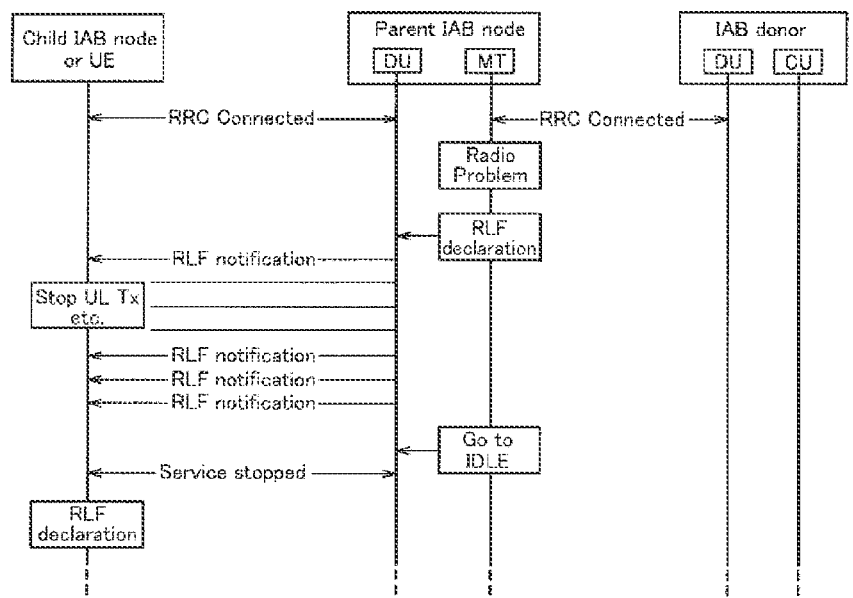
FIG. 16 is a diagram related to a supplementary note.

FIG. 15 is a diagram illustrating Operation Example 5 of the second embodiment.

As illustrated in FIG. 15, the lower apparatus B is in dual connectivity communication with the MN 300M and the SN 300S. Each of the MN 300M and the SN 300S is an IAB node. A backhaul link is established between the MN 300M and the upper apparatus A1, and a backhaul link is established between the SN 300S and the upper apparatus A2. In the present operation example, it is assumed that no interface exists between the MN 300M and the SN 300S.

In the present operation example, when BH RLF of the SN 300S is occurring, the lower apparatus B receives, from the MN 300M, a message directed to the SN 300S, and transfers the message received to the SN 300S. The message directed to the SN 300S is, for example, a message for the inter-base station interface (Xn interface) or a message for a CU-DU interface (F1 interface) and is a release message for releasing the SN 300S.

Specifically, the communication control method according to the present operation example is a communication control method used in the mobile communication system 1 configured to form at least one communication path with a plurality of IAB nodes 300 between the UE 100 and the donor apparatus 200, the method including:

1) performing, by the lower apparatus B, dual connectivity communication with the MN 300M and SN 300S included in the plurality of IAB nodes 300,
2) by the SN 300S, detecting BH RLF between the upper apparatus A2 and the SN 300S and then by the lower apparatus B, receiving from the MN 300M a message directed to the SN 300S,
3) by the lower apparatus B, transferring to SN 300S the message received from MN 300M.

Thus, even when BH RLF of the SN 300S is detected and no interface exists between the MN 300M and the SN 300S, the SN 300S can receive the message from the MN 300M.

The present operation example includes the following procedure.

Firstly, the lower apparatus B receives, from the SN 300S, the BH RLF Notification indicating BH RLF of the SN 300S. The lower apparatus B may receive, from the MN 300M, the BH RLF Notification indicating the BH RLF of the SN 300S (see Operation Example 4). In response to receiving, from the SN 300S, the BH RLF Notification indicating the BH RLF of the SN 300S, the lower apparatus B may transmit the Failure Indication to the MN 300M (see Operation Example 2).

Secondly, the MN 300M or the donor apparatus 200 indicates the relay of the network interface (such as Xn/F1) to the lower apparatus B. The MN 300M or the donor apparatus 200 may configure exception routing in routing table information of the lower apparatus B. This configuration includes either of the ID of the SN 300S or the cell of the SN 300S, or the ID of entity of the BAP layer of the SN 300S. The lower apparatus B may notify the SN 300S that exception routing via the lower apparatus B has been configured or may make a request for the exception routing via the lower apparatus B, to the SN 300S.

The lower apparatus B may notify (respond to) the MN 300M or donor apparatus 200 whether a relay route via the lower apparatus B has been established. When the notification indicates that the relay route fails to be established (NG), information indicating the cause of NG such as rejection by the SN 300S or rejection by the lower apparatus B may be included in the notification.

Thirdly, the MN 300M or the donor apparatus 200 transmits a message of the network interface (e.g., a Secondary Node Release message) to the relay route. The message is encapsulated and carried by, for example, an RRC message or a BAP control message.

Fourthly, the lower apparatus B transfers the encapsulated message to the SN 300S in accordance with the exception routing information described above.

Fifthly, the SN 300S receives the encapsulated message and performs an operation in accordance with the message received. For example, the SN 300S performs processing such as stopping of use of radio resources in response to receiving Secondary Node Release. The SN 300S may use the exception routing return Secondary Node Release Acknowledge to the MN 300M or donor apparatus 200 via the lower apparatus B.

Other Embodiments

In the embodiments and the modification examples of the embodiments described above, an example has been mainly described, in which the mobile communication system 1 is a 5G mobile communication system. However, the base station in the mobile communication system 1 may be an eNB used as an LTE base station. The core network in the mobile communication system 1 may be an Evolved Packet Core (EPC). Furthermore, the gNB can also be connected to the EPC, the eNB can also be connected to the 5GC, and the gNB and the eNB can also be connected via an inter-base station interface (Xn interface, X2 interface).

A program may be provided that causes a computer to execute each of the processing operations according to the embodiments and the modification examples of the embodiments described above. The program may be recorded in a computer-readable medium. Use of the computer-readable medium enables the program to be installed on a computer. Here, the computer-readable medium on which the program is recorded may be a non-transitory recording medium. The non-transitory recording medium is not particularly limited and may be, for example, a recording medium such as a CD-ROM or a DVD-ROM. A chip set may be provided that includes a memory that stores a program for executing each of the processing operations performed by the UE 100, the gNB 200, or the IAB node 300 and a processor that executes the program stored in the memory.

Note that the flows illustrated in each figure may be combined as appropriate.

Supplementary Note

Introduction

For backhaul link radio link failure (BH RLF), RAN2 has reached the following agreement:

R2 assumes that an RLF notification for BH link RLF is provided at least to a downstream node.

Once recovery from a failure in the BH link is achieved, an alternative route and/or dual connectivity may be utilized (if agreed upon).

The current UE RLF detection and recovery are reused as a baseline.

For example, it is necessary to further study whether another indication needs to be provided when the link is recovered or when the recovery is ongoing.

In addition to the agreement, RAN2 has discussed the details of RLF notifications including RLF notifications for the downstream nodes and RLF notifications for the upstream nodes.

The discussion in the supplementary note focuses on the remaining problems of BH RLF handling, particularly RLF notifications to downstream nodes.

Note that the supplementary note assumes a relationship in which a "parent" node transmits an RLF notification to a "child" node.

Discussion

RLF Notification and Other Indications

It should be noted that while the Rel-15 UE is continuously allowed to connect to IAB nodes, the agreed "RLF notification" is an Rel-16 function. For minimized stopping of service provision for the Rel-15 UE, when recovery of a backhaul link fails, the IAB node should stop transmission of SSBs (PSS, SSS, and PBCH). This is because the IAB node evidently fails to continue to provide service without the backhaul link and intentionally poses radio problems for the Rel-15 UE.

Observation 1: The agreed "RLF notification" cannot function for the Rel-15 UE.

Proposal 1: RAN2 should agree that the IAB node stops transmission of the SSB when the recovery of the backhaul link fails.

Proposal 1 implies that the IAB node may continue to provide service until the recovery of the backhaul link fails. Next, as in the case where "it is necessary to further study whether another indication needs to be provided when the link is recovered or when the recovery is ongoing, for example", it is necessary to further study whether notifying downstream MTs/UE of the backhaul link state is valuable. However, when the RLF notification is repeatedly transmitted during the BH RLF, any "other indication" need not be specified. In other words, when no RLF notification is transmitted, then no BH RLF has occurred or recovery from BH RLF has been achieved, and otherwise the recovery of the backhaul link is ongoing. Thus, the issue is whether the RLF notification is repeatedly transmitted during the BH RLF.

Proposal 2: RAN2 should agree that the RLF notification is repeatedly transmitted during the BH RLF.

RRC Connected

While BH RLF is occurring in a parent IAB node, uplink data from a child IAB node/UE evidently fails to reach an IAB donor. Continued uplink transmission may cause unwanted problems such as power consumption by the child IAB node/UE, the risk of overflow of a buffer in the parent IAB node, and interference on the network. Thus, the child node/UE should refrain from SR transmission at least in new data transmission.

Proposal 3: RAN2 should agree that the MT/UE stops uplink signals or SRs for data transmission in response to receiving the RLF notification.

When the parent IAB node is subjected to RLF on the backhaul link of the parent IBA node, the RLF notification is transmitted, but that access link may still be acceptable. In other words, no RLF is occurring in the link between the parent IAB node and the child IAB node. Since RAN2 agrees that "the current UE RLF detection and recovery are reused as a baseline", the child node/UE does not declare RLF, and in this case does not trigger the RLF notification.

When the receipt of the RLF notification triggers the existing RLF as an additional rule, this further triggers the transmission of the RLF notification to the downstream node, and the RLF notification is immediately propagated throughout an IAB topology. This may cause all the IAB nodes to simultaneously initiate RRC re-establishment, destroying the IAB topology. Thus, the receipt of the RLF notification does not trigger the RRC re-establishment.

Proposal 4: RAN2 should agree that the MT/UE does not declare RLF including the initiation of the RRC re-establishment in response to receiving the RLF notification and does not trigger the transmission of the RLF notification.

RRC Idle

Another aspect is the behavior of the MT/UE in an RRC idle state. When Proposal 3 can be agreed upon, the MT/UE in the idle mode can very easily refrain from initiating an RRC setup request to the parent IAB node, subjected to BH RLF. This can be considered as a type of access restriction. Even when the RRC setup request message is transmitted, the message is prevented from being transferred to the IAB donor (i.e., a CU with a peer RRC entity) due to BH RLF, eventually leading to a failure in the procedure.

Proposal 5: RAN2 should agree that the MT/UE in the RRC idle state should refrain from initiating the RRC setup request to the parent IAB node transmitting the RLF notification.

The issue is how a cell reselection process handles BH RLF, i.e., whether the parent IAB node transmitting BH RLF is a candidate cell for reselection. When the BH RLF may be recovered in a short time, such optimization is not required. Otherwise, the MT/UE eventually fails to establish an RRC connection with the cell without a BH link, potentially causing a bad user experience.

Proposal 6: RAN2 should discuss whether the MT/UE in the RRC idle state can reselect the parent IAB node transmitting the RLF notification.

Study of Case of Dual Connectivity

Figure 17:
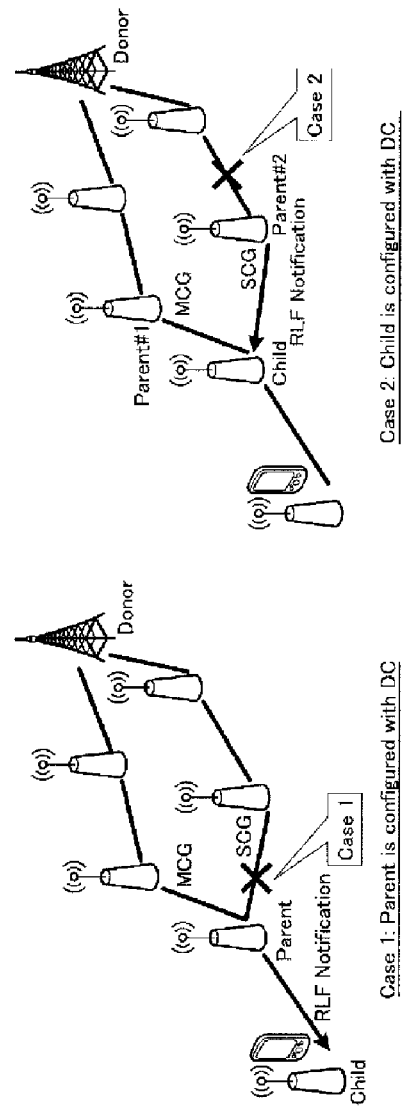
FIG. 17 is a diagram related to the supplementary note.

Dual connectivity is a complex scenario, but RAN2 has agreed that "once recovery from a failure in the BH link is achieved, an alternative route and/or dual connectivity may be utilized (if agreed upon)." This can be classified into two cases: a case where the parent has dual connectivity (that is, Case 1 in FIG. 17) and a case in which the child has dual connectivity (that is, Case 2 in FIG. 17).

Case 1 (Parent Is Configured With DC)

In Case 1, the RLF notification may be triggered by either MCG RLF or SCG RLF. In the case of EN-DC (i.e., a C-plane is on an LTE Uu), the use of the MCG for the backhaul link is not assumed as in the case where RN2 has agreed that "the IAB node using EN-DC corresponds to deployment of a single link (only a BAP route with an NR link) in terms of BAP and backhaul RLC channels." Thus, even when RLF occurs only in the SCG link, the RLF should be considered as BH RLF in terms of the IAB topology. This also means that the RLF notification should be transmitted by the parent IAB node for SCG RLF.

Observation 2: for the IAB node configured for EN-DC, the SCG RLF should trigger the RLF notification.

On the other hand, for NR-DC, the backhaul link may be established only for the SCG or for both the SCG and the MCG. Of course, the former case (BH for only the SCG) is similar to the case of EN-DC. In the latter case (BH for both MCG and SCG), the SCG RLF definitely does not trigger the RLF notification, but it is doubtful whether the MCG RLF always triggers the RLF notification.

In the current specification, the UE stops UL transmission to the SCG in response to occurrence of MCG RLF ("suspends all RBs except for SRBO" in RRC re-establishment). This can be considered as BH RLF. On the other hand, even when MCG RLF occurs, the quality of the SCG link remains good and may be continuously used due to robust backhaul. Thus, the current principle related to the stopping of UL transmission may need to be reviewed depending on whether the SCG link should be used in the event of a failure in the MCG link. For example, a high speed MCG link recovery mechanism discussed in DCCA WI may be studied.

Observation 3: in the case of an IAB node configured for NR-DC and including BH only for the SCG, SCG RLF triggers the RLF notification (as in the case of Observation 2).

Proposal 7: RAN2 should agree that SCG RLF triggers the RLF notification when the backhaul link includes only the SCG (i.e., the EN-DC and the NR-DC in which only the SCG includes backhaul).

Proposal 8: RAN2 should agree that MCG RLF always triggers the RLF notification.

Observation 4: when the SCG link is used in the case of MCG RLF, the current principle related to the stopping of UL transmission may need to be reviewed. The high speed recovery of the MCG link in DCCA WI is expected to be discussed.

Case 2 (Child Is Configured With DC)

In case 2, dual connectivity in terms of the child IAB node makes two parent IAB nodes available for the backhaul link. Thus, the issue is which parent IAB node transmits the RLF notification in the case of that BH RLF.

One approach is that the MCG always transmits the RLF notification regardless of whether BH RLF occurs in the backhaul link associated with the MCG (or the MN) or SCG (or the SN). This would be reasonable because the MCG includes a C-plane connection with the child IAB node. However, this means that the SCG (SN) needs to notify the MCG (MN) of the BH RLF. With BH RLF occurring, inter-node connections are not always available (see FIG. 17).

Thus, the processing is facilitated when the RLF notification for the MCG is separated from the RLF notification for the SCG. In other words, the MCG transmits the RLF notification only in the case of BH RLF in the MCG, and the SCG transmits the RLF notification only in the case of BH RLF in the SCG. This is easy when the MAC CE is used for the RLF notification because two separate MACs are configured for each CG in dual connectivity.

Proposal 9: RAN2 should agree that the RLF notification may be transmitted by either the MCG or the SCG via the MAC CE.

On the other hand, when the child IAB node receives the RLF notification from the SCG, the child IAB node stops the UL transmission to the SCG in a case where Proposal 3 is accepted. This may actually be considered as a type of SCG failure, and the child IAB node may expect the MCG to adapt the topology (e.g., change the secondary node). However, depending on the IAB topology, when a failure occurs in the BH link of the SCG, the MCG may fail to recognize that the BH link of the SCG is (at least temporarily) disconnected, and may fail to take appropriate action. Accordingly, it is necessary to study whether notification to the MCG is enabled when the child node receives the RLF notification from the SCG, for example, via the failure information or the SCG failure information.

Proposal 10: RAN2 should discuss whether the MT/UE is permitted to provide a notification to the MCG in response to receiving the RLF notification from the SCG.

The invention claimed is:

1. A communication control method used in a mobile communication system in which at least one communication path is formed between a user equipment and a donor apparatus by using a plurality of relay apparatuses, the communication control method comprising:
    performing, by a first relay apparatus included in the plurality of relay apparatuses, dual connectivity communication with a master node and a secondary node;
    receiving from the master node, by the first relay apparatus, a first failure notification on a failure of a backhaul link between an upper apparatus of the master node and the master node;
    after receiving the first failure notification from the master node, receiving from the secondary node, by the first relay apparatus, a second failure notification on a failure of a backhaul link between an upper apparatus of the secondary node and the secondary node;
    after receiving the first failure notification from the master node and receiving the second failure notification from the secondary node, starting a timer by the first relay apparatus; and
    in response to expiration of the timer, transmitting by the first relay apparatus to a lower apparatus of the first relay apparatus, a third failure notification on a failure of a backhaul link of the first relay apparatus.

2. The communication control method according to claim 1, wherein
    a value of the timer is configured in the first relay apparatus by the donor apparatus.

3. The communication control method according to claim 1, further comprising:
    after receiving the second failure notification, performing recovery of backhaul communication of the first relay apparatus.

4. A first relay apparatus included in a plurality of relay apparatuses forming at least one communication path between a user equipment and a donor apparatus, the first relay apparatus comprising a processor and a memory, the processor configured to:
    perform dual connectivity communication with a master node and a secondary node;
    receive from the master node a first failure notification on a failure of a backhaul link between an upper apparatus of the master node and the master node;
    after receiving the first failure notification from the master node, receive, from the secondary node, a second failure notification on a failure of a backhaul link between an upper apparatus of the secondary node and the secondary node;

after receiving the first failure notification from the master node and receiving the second failure notification from the secondary node, start a timer; and in response to expiration of the timer, transmit to a lower apparatus of the first relay apparatus, a third failure notification on a failure of a backhaul link of the first relay apparatus.

5. A chipset provided in a first relay apparatus included in a plurality of relay apparatuses forming at least one communication path between a user equipment and a donor apparatus, the chipset comprising a processor and a memory, the processor configured to:

perform dual connectivity communication with a master node and a secondary node;

receive from the master node a first failure notification on a failure of a backhaul link between an upper apparatus of the master node and the master node;

after receiving the first failure notification from the master node, receive from the secondary node, a second failure notification on a failure of a backhaul link between an upper apparatus of the secondary node and the secondary node;

after receiving the first failure notification from the master node and receiving the second failure notification from the secondary node, start a timer; and in response to expiration of the timer, transmit to a lower apparatus of the first relay apparatus, a third failure notification on a failure of a backhaul link of the first relay apparatus.

6. A non-transitory computer-readable medium comprising, stored thereupon, computer program instructions for execution by a first relay apparatus included in a plurality of relay apparatuses forming at least one communication path between a user equipment and a donor apparatus, the program instructions being configured to cause the first relay apparatus to execute processing of:

performing dual connectivity communication with a master node and a secondary node;

receiving from the master node a first failure notification on a failure of a backhaul link between an upper apparatus of the master node and the master node;

after receiving the first failure notification from the master node, receiving, from the secondary node, a second failure notification on a failure of a backhaul link between an upper apparatus of the secondary node and the secondary node;

after receiving the first failure notification from the master node and receiving the second failure notification from the secondary node, starting a timer; and in response to expiration of the timer, transmitting to a lower apparatus of the first relay apparatus, a third failure notification on a failure of a backhaul link of the first relay apparatus.

7. A mobile communication system in which at least one communication path is formed between a user equipment and a donor apparatus by using a plurality of relay apparatuses, the mobile communication system comprises:

a first relay apparatus included in the plurality of relay apparatuses, wherein the first relay apparatus is configured to:

perform dual connectivity communication with a master node and a secondary node;

receive, from the master node, a first failure notification on a failure of a backhaul link between an upper apparatus of the master node and the master node;

after receiving the first failure notification from the master node, receive from the secondary node, a second failure notification on a failure of a backhaul link between an upper apparatus of the secondary node and the secondary node;

after receiving the first failure notification from the master node and receiving the second failure notification from the secondary node, start a timer; and in response to expiration of the timer, transmit to a lower apparatus of the first relay apparatus, a third failure notification on a failure of a backhaul link of the first relay apparatus.

\* \* \* \* \*